US008311541B2

(12) United States Patent
Yano et al.

(10) Patent No.: US 8,311,541 B2
(45) Date of Patent: Nov. 13, 2012

(54) MOBILE COMMUNICATION SYSTEM FOR LOW POWER CONSUMPTION, CALL CONTROL SERVER AND ACCESS GATEWAY

(75) Inventors: Masashi Yano, Kawasaki (JP); Hitomi Nakamura, Kokubunji (JP); Masahiro Takatori, Yokohama (JP); Takehiro Morishige, Kawasaki (JP); Yoshihiro Shimizu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 192 days.

(21) Appl. No.: 12/690,455

(22) Filed: Jan. 20, 2010

(65) Prior Publication Data

US 2010/0184432 A1 Jul. 22, 2010

(30) Foreign Application Priority Data

Jan. 22, 2009 (JP) ................................ 2009-012156

(51) Int. Cl.
*H04W 36/00* (2009.01)

(52) U.S. Cl. ..................... 455/436; 455/435.1; 455/455; 455/452.1; 455/453; 455/343; 455/411; 455/414.1; 455/419; 455/421; 455/433; 455/456.1; 455/507; 455/437; 455/438; 455/439; 455/442; 455/443; 455/444; 370/311; 709/218; 709/220; 709/221; 709/222; 709/223; 709/224; 709/225; 709/226; 709/230; 709/232; 709/233; 709/234; 709/235

(58) Field of Classification Search .................. 455/437, 455/438, 439, 442, 444, 443, 435.1, 436, 455/445, 452.1, 453, 343, 411, 414.1, 419, 455/421, 433, 456.1, 507, 524, 561; 370/311; 709/218, 220, 221, 222, 223, 224, 225, 226, 709/230, 232, 233, 234, 235

See application file for complete search history.

(56) References Cited

U.S. PATENT DOCUMENTS

| | | | | |
|---|---|---|---|---|
| 6,360,106 | B1 * | 3/2002 | Besson | 455/561 |
| 6,584,330 | B1 * | 6/2003 | Ruuska | 455/574 |
| 7,634,558 | B1 * | 12/2009 | Mangal et al. | 709/224 |
| 7,693,506 | B1 * | 4/2010 | Bäck et al. | 455/432.1 |
| 2005/0233745 | A1 * | 10/2005 | Noguchi et al. | 455/433 |
| 2006/0286979 | A1 * | 12/2006 | Enderlein et al. | 455/435.1 |
| 2007/0183347 | A1 * | 8/2007 | Gu et al. | 370/258 |
| 2007/0260897 | A1 * | 11/2007 | Cochran et al. | 713/300 |
| 2007/0271475 | A1 | 11/2007 | Hatasaki et al. | |
| 2007/0293241 | A1 * | 12/2007 | Tamura | 455/456.1 |
| 2009/0280854 | A1 * | 11/2009 | Khan et al. | 455/522 |

FOREIGN PATENT DOCUMENTS

JP 2007-310791 A 11/2007

* cited by examiner

*Primary Examiner* — Justin Lee
(74) *Attorney, Agent, or Firm* — Mattingly & Malur, PC

(57) ABSTRACT

It is provided a mobile communication system comprising base stations, call control servers and access gateways. The call control servers cause a mobile terminal accommodated in one of the control server to transmit the location registration request so that the mobile terminal accommodates in another control server according to a processing amount of control signals. The base station selects a second call control server into which the one of the mobile terminals is to be newly accommodated. The one of the call control server switches to a power-saving state after the mobile terminal is accommodated into the another call control server.

11 Claims, 14 Drawing Sheets

MME POOL TABLE 502

601 602 603 604

| MME NAME | MME IDENTIFIER | IP ADDRESS | WEIGHTING |
|---|---|---|---|
| MME1 | 081000000112340003 | 10.100.0.1 | 1 |
| MME2 | 081000000112340004 | 10.100.0.3 | 2 |
| ………… | ………… | ………… | ………… |

LOAD MEASUREMENT TABLE 704

| MME NAME (801) | ACCOMMODATED MOBILE TERMINAL COUNT (802) | SIGNAL PROCESSING COUNT (803) | PAGING COUNT (804) | ACTIVE USER COUNT (805) | CPU USAGE RATIO (806) | TRACKING AREA UPDATE COUNT (807) |
|---|---|---|---|---|---|---|
| MME1 | 223, 123 | 6,345,123 | 24,498 | 35,127 | 33 | 15,498 |
| ......... | ............ | ............ | | ............ | | ............ |
| ......... | ............ | ............ | ............ | ............ | | ............ |

LOAD MEASUREMENT TABLE 903

1001 1002 1003 1004 1005 1006 1007

| S-GW NAME | ACCOMMODATED MOBILE TERMINAL COUNT | SIGNAL PROCESSING COUNT | ACTIVE USER COUNT | CPU USAGE RATIO | TRANSFERRED PACKET COUNT | TRANSFERRED BYTE COUNT |
|---|---|---|---|---|---|---|
| SGW1 | 43, 123 | 6,345,123 | 35,127 | 33 | 10,345,052 | 450,324,912 |
| ……… | ………… | ………… | ……… … | ……… | | |
| ……… | ………… | ………… | ……… … | ……… | | |

*Fig. 10*

IN-SERVICE STATE OPERATION

POWER-SAVING STATE OPERATION

MOBILE COMMUNICATION SYSTEM FOR LOW POWER CONSUMPTION, CALL CONTROL SERVER AND ACCESS GATEWAY

CLAIM OF PRIORITY

The present application claims priority from Japanese patent application JP 2009-012156 filed on Jan. 22, 2009, the content of which is hereby incorporated by reference into this application.

BACKGROUND OF THE INVENTION

This invention relates to a mobile communication system that provides an IP access service, and more particularly, to a system that reduces power consumption of nodes.

At present, there is provided a 3.5-generation mobile communication service. This service has been allowing an upgraded environment in which a mobile terminal uses connection to the Internet for electronic mail, access to the WEB, and the like.

Further, as a 3.9-generation mobile communication system, worldwide interoperability for microwave access (WiMAX) and long term evolution (LTE) are being developed, and standardization thereof is underway. WiMAX and LTE are next-generation mobile communication systems for realizing high speed that exceeds 10 Mbps at a wider band (5 MHz or higher) by using orthogonal frequency division multiplexing access (OFDMA).

Meanwhile, as stipulated in the Kyoto Protocol, Japan is required to reduce the amount of emissions of greenhouse gases including $CO_2$ from 2008 until 2012. In order to realize the reduction in the greenhouse gas power saving of ICT equipment, which is called "green ICT" is proposed.

As a technology compatible therewith, JP 2007-310791 A discloses a technology for realizing improvement in operational efficiency and reduction in power consumption by causing, in a case where a plurality of servers are connected to one another via a network, a processing program and a process to be relocated among the servers on the network to change the number of servers in actual service.

SUMMARY OF THE INVENTION

At present, studies of next-generation mobile communication systems such as WiMAX and LTE are underway. An OFDMA system that allows faster radio communications is introduced to those systems in place of 3.5-generation code division multiple access (CDMA).

This requires a communication speed (peak rate) of transmission/reception performed by a base station to be higher. Therefore, a higher processing performance is required of the base station or nodes (for example, a mobility management call control server and an access gateway) of a radio access network (RAN) that accommodate the mobile terminal. In other words, the nodes of the RAN need to be provided with higher-performance processors. Therefore, power consumption of the processor tends to increase due to the increased number of processors or increased clock.

Meanwhile, a utilization factor of a mobile communication service is greatly associated with human social activities. For example, the late-night utilization factor is smaller than the weekday/daytime utilization factor. In other words, the utilization factor of the service varies depending on a time of day. In conjunction therewith, a traffic amount of communication packets processed by the nodes of the RAN greatly varies depending on a time of day.

Further, as in the background of the proposed green ICT, an increase in the communication traffic amount has been causing an increase in the ICT equipment, and hence it is a significant social problem to reduce the power consumption of the ICT equipment. In order to realize mobile communications that conform to the green ICT, it is necessary to reduce the power consumption by dynamically operating the mobility management call control server and the access gateway according to the traffic amount.

This invention has been made in view of the above-mentioned problem, and one object thereof is to provide a system that can reduce power consumption by changing a configuration of nodes according to traffic of a network.

A representative aspect of this invention is as follows. That is, there is provided a mobile communication system comprising a plurality of base stations to which mobile terminals are to be connected, and a plurality of call control servers that accommodate the mobile terminals based on a location registration request. The plurality of call control servers include at least a first call control server and a second call control server. The first call control server calculates a load on the first call control server based on a processing amount of control signals between the plurality of base stations and the first call control server, and causes at least one of the mobile terminals accommodated in the first call control server to transmit the location registration request in a case of which it is judged that the load on the first call control server is low based on at least one of a result of comparison between the calculated load and a predetermined threshold value and a result of comparison between the number of mobile terminals accommodated in the first call control server and a predetermined number. The one of the plurality of base stations selects the second call control server into which the one of the mobile terminals is to be newly accommodated from among the plurality of call control servers in a case of which the location registration request transmitted from the one of the mobile terminals is received, and forwards the location registration request to the selected second call control server. The second call control server is configured to accommodate the one of the mobile terminals in a case of which the forwarded location registration request is received. The first call control server is further configured to switch to a power-saving state after the one of the mobile terminals is accommodated into the second call control server.

According to a representative embodiment of this invention, it is possible to reduce the power consumption of the system by changing the configuration of the nodes in the network according to a network traffic amount or the like.

BRIEF DESCRIPTION OF THE DRAWINGS

The present invention can be appreciated by the description which follows in conjunction with the following figures, wherein:

FIG. 10 is an explanatory table illustrating an example of a structure of a load measurement table of the S-GW according to the first embodiment of this invention;

DETAILED DESCRIPTION OF THE PREFERRED EMBODIMENTS

Hereinafter, description is made of embodiments of this invention by referring to the accompanying drawings.

First Embodiment

Figure 1:
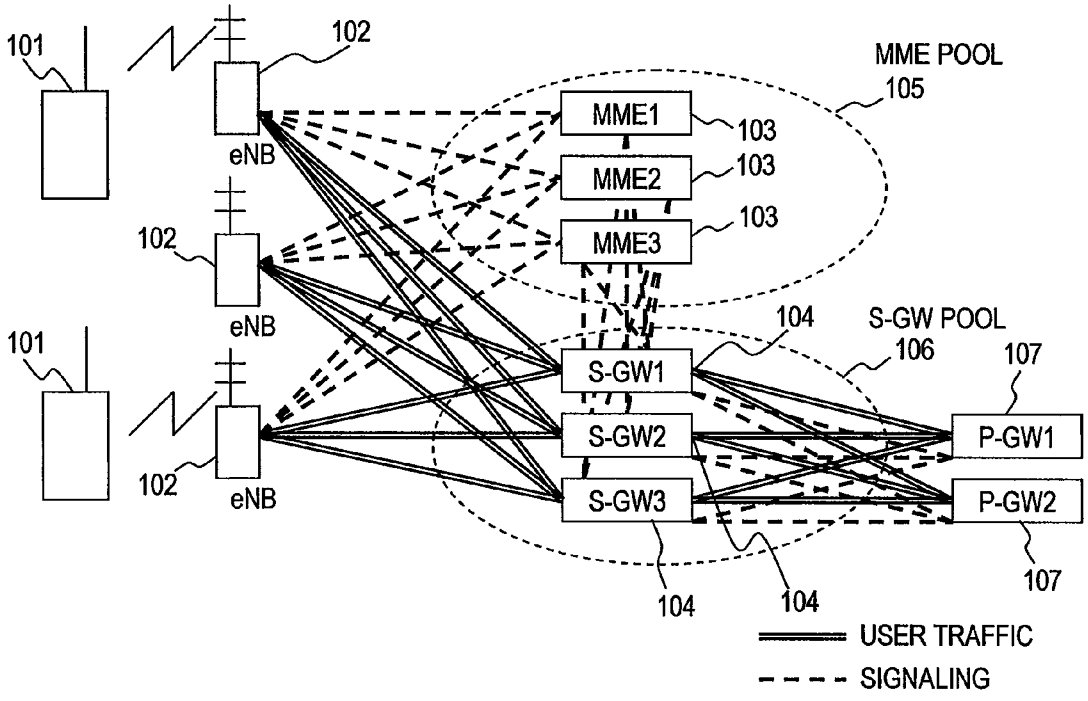
FIG. 1 is an explanatory diagram illustrating an example of a configuration of a long term evolution (LTE) system being a 3.9-generation mobile communication system.

FIG. 1 is an explanatory diagram illustrating an example of a configuration of a mobile communication system according to a first embodiment of this invention.

FIG. 1 illustrates an example of a configuration of a long term evolution (LTE) system being a 3.9-generation mobile communication system.

The mobile communication system according to the first embodiment includes a plurality of base stations (eNBs: eNodeBs) 102, a plurality of mobility management entities (MME, mobility management call control servers) 103, a plurality of service gateways (S-GWs) 104, and a plurality of packet data network gateways (P-GWs) 107. The base station 102 connects a line to a user entity 101 located in a tracking area (a location area) of its own station.

The MME 103 receives a tracking area update request (a location registration request) transmitted from the user entity (mobile terminal) 101. Further, the MME 103 executes location management of the user entity 101, an authentication processing thereof, and a paging processing of the user entity 101 in an idle state. Further, the MME 103 controls handover. Further, the MME 103 controls a tunnel between the base station 102 and the S-GW 104.

The S-GW 104 GRE-encapsulates an IP packet addressed to the user entity 101 which has been forwarded from the P-GW 107 by GRE tunneling between the S-GW 104 and the base station 102, and forwards the GRE-encapsulated packet to the base station 102. Further, the S-GW 104 receives the packet that has been transmitted from the user entity 101 and GRE-encapsulated at the base station 102, decapsulates the received packet, and forwards the packet to the P-GW 107.

The P-GW 107 is a gateway to a network that provides the user entity 101 with a service. The P-GW 107 forwards the packet transmitted/received by the user entity 101 to the S-GW 104. Between the S-GW 104 and the P-GW 107, a GTP (GPRS tunneling protocol) tunnel or a PMIP (proxy mobile IP) tunnel is set by tunneling of GTP or PMIP.

An MME pool 105 is a group of the MMEs 103 that accommodate the user entities 101. The base station 102 manages a table for the MME pool 105. When the user entity 101 is first connected to a radio access network (RAN), the base station 102 selects one of the MMEs 103 from within the MME pool 105, and assigns the selected MME 103 to the user entity 101. After the user entity 101 is accommodated into the MME 103, the MME 103 assigns globally unique MME identifier (GUTI) to the user entity 101.

Here, the term "GUTI" represents an identifier temporarily assigned to the user entity 101. The identifier includes a field for uniquely identifying the MME 103. In a case where the user entity 101 regains an active state from the idle state, the user entity 101 notifies the base station 102 of the GUTI assigned to the user entity 101. This allows the base station 102 to identify the MME 103 that accommodates the user entity 101 and execute a processing for the connection.

Further, the MME 103 selects one of the S-GWs 104 that accommodates the user entity 101, and assigns the selected S-GW 104 to the user entity 101.

The S-GW 104 is used for communications with a packet data network performed by the user entity 101 after the user entity 101 switches to the active state and establishes a connection to the base station 102. Further, after the base station 102 and the selected S-GW 104 exchange a control signal therebetween, the MME 103 sets tunneling information, and sets a tunnel between the base station 102 and the S-GW 104.

An S-GW pool 106 is a group of the S-GWs 104 that accommodate the user entities 101. The MME 103 selects the S-GWs 104 that accommodates the user entity 101 from within the S-GW pool 106.

Figure 2:
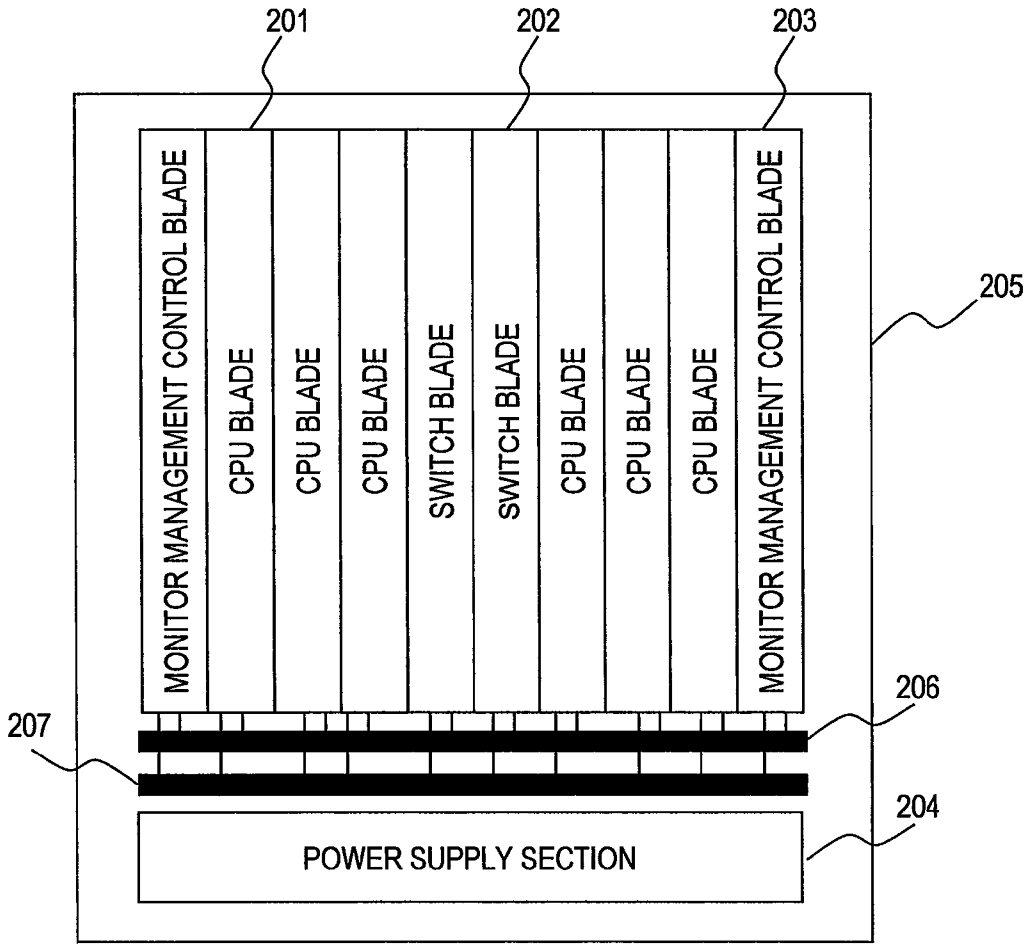
FIG. 2 is an explanatory diagram illustrating an example of a configuration of a blade server according to a first embodiment of this invention.

FIG. 2 is an explanatory diagram illustrating an example of a configuration of a blade server according to the first embodiment of this invention.

The blade server according to the first embodiment includes, for example, a CPU blade 201, a switch blade 202, a monitor management control blade 203, and a power supply section 204. The devices are connected to one another via a switch wiring 206 and a management bus 207. Further, the devices are stored in a casing 205.

The CPU blade 201 processes a control signal. Further, the CPU blade 201 encapsulates or decapsulates the packet addressed to the user entity 101 and the packet transmitted from the user entity 101, and forwards the encapsulated or decapsulated packet. Further, the CPU blade 201 manages the user entity 101 accommodated in the CPU blade 201. Further, the CPU blade 201 measures a loaded state of the CPU blade

201. The CPU blade 201 operates as the MME 103, the S-GW 104, or the P-GW 107. The MME 103, the S-GW 104, and the P-GW 107 may be stored in one casing 205, or may be each stored in a different casing. Further, the CPU blades 201 that have mutually different functions may be stored in the one casing 205.

The switch blade 202 is used for a connection to another equipment and a connection to an external network.

The monitor management control blade 203 manages the loaded state and operation state of each of the CPU blades 201. Further, the monitor management control blade 203 controls the power source (power relay 307 described later with reference to FIG. 3) of each of the CPU blades 201 to thereby switch each of the blades 201 and 202 to an in-service state or a power-saving state.

The power supply section 204 supplies power to each of the blades 201 through 203. The switch wiring 206 is a wiring for a connection between each of the CPU blades 201 and the switch blade 202. The CPU blades 201 can communicate with one another via the switch blades 202. The management bus 207 is a bus connected to IPMC (described later with reference to FIG. 3) of each of the blades 201 through 203. The monitor management control blade 203 can control power source of each of the CPU blades 201 via the management bus 207.

Hereinafter, detailed description is made of a configuration of the CPU blade 201.

Figure 3:
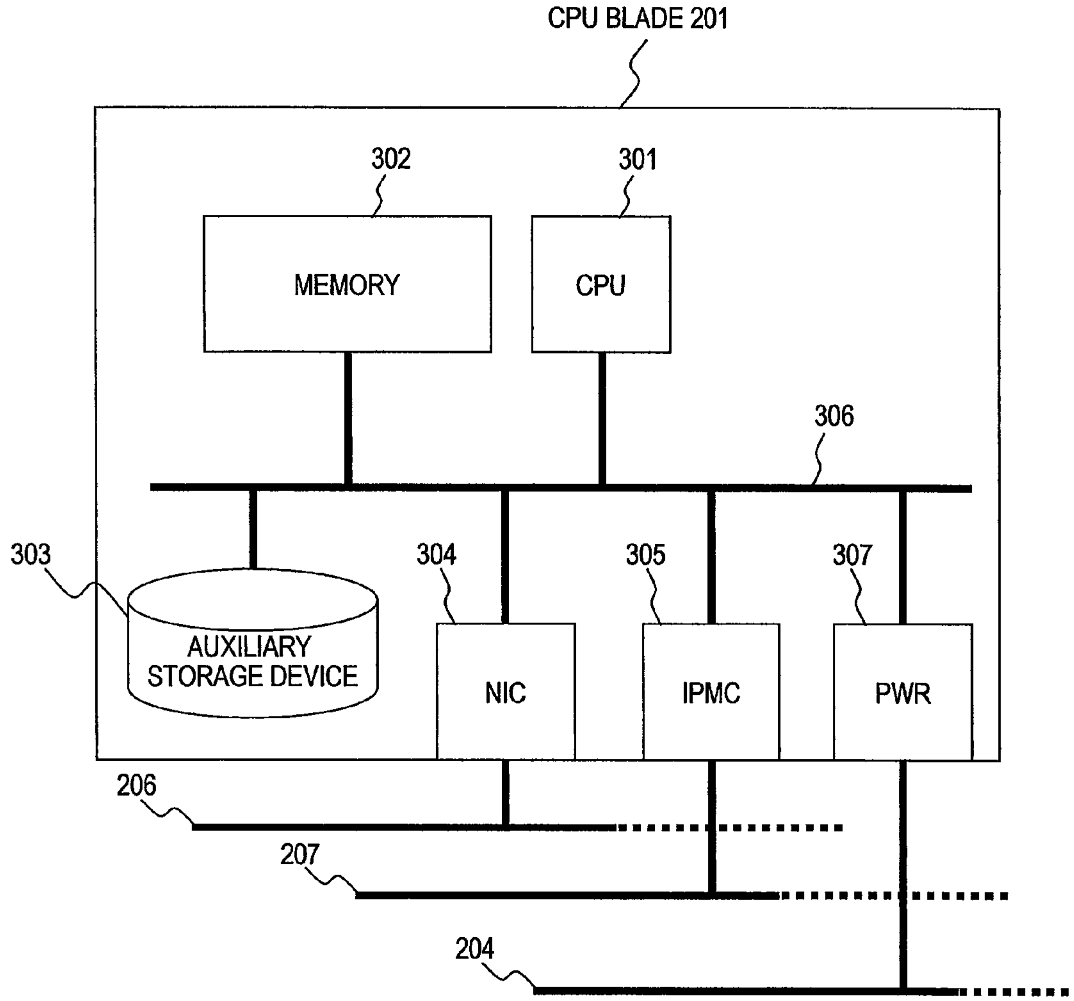
FIG. 3 is a block diagram illustrating an example of a configuration of a CPU blade according to the first embodiment of this invention.

FIG. 3 is a block diagram illustrating an example of a configuration of a CPU blade according to the first embodiment of this invention.

The CPU blade 201 includes a CPU 301, a memory 302, an auxiliary storage device 303, a network interface card (NIC) 304, an intelligent platform management controller (IPMC) 305, and the power relay 307. The components are connected to one another via a bus 306.

Further, the NIC 304 is connected to the switch blade 202 inside the casing 205 via the switch wiring 206. The IPMC 305 is connected to the switch blade 202 inside the casing 205 via the management bus 207.

The power relay 307 supplies power from the power supply section 204 in the casing 205 to the CPU blade 201.

The memory 302 stores a group of programs for implementing functions of the MME 103, the S-GW 104, or the P-GW 107. Further, the memory 302 stores a group of storage tables used by the above-mentioned programs. The CPU 301 is a processor that reading the programs stored in the memory 302 and executing the read programs. The auxiliary storage device 303 stores various programs and data. The NIC 304 communicates with another CPU blade 201 or an external network device via the switch blade 202 inside the casing 205.

The IPMC 305 controls the power relay 307 according to a command issued from the monitor management control blade 203, and turns off the power source of the CPU blade 201 or effects a sleep state thereof corresponding to a power-saving mode.

Figure 4:
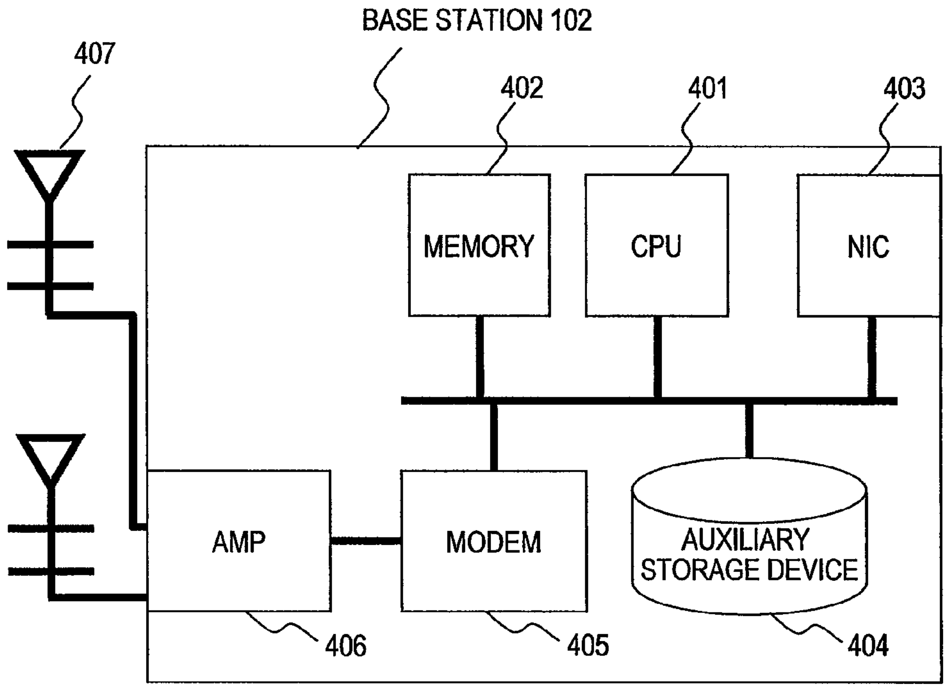
FIG. 4 is a block diagram illustrating an example of a base station according to the first embodiment of this invention.

FIG. 4 is a block diagram illustrating an example of the base station according to the first embodiment of this invention.

The base station 102 according to the first embodiment includes a CPU 401, a memory 402, a network interface card (NIC) 403, an auxiliary storage device 404, a MODEM 405, an amplifier 406, and an antenna 407. The components are connected to one another via a bus.

The CPU 401 is a processor for executing various programs stored in the memory 402. The NIC 403 is an interface for communicating with the MME 103 and the S-GW 104. The auxiliary storage device 404 stores various programs and data. The MODEM 405 modulates/demodulates data processed by the CPU 401. The amplifier 406 amplifies a radio signal. The antenna 407 transmits/receives the radio signal to/from the user entity 101.

Figure 5:
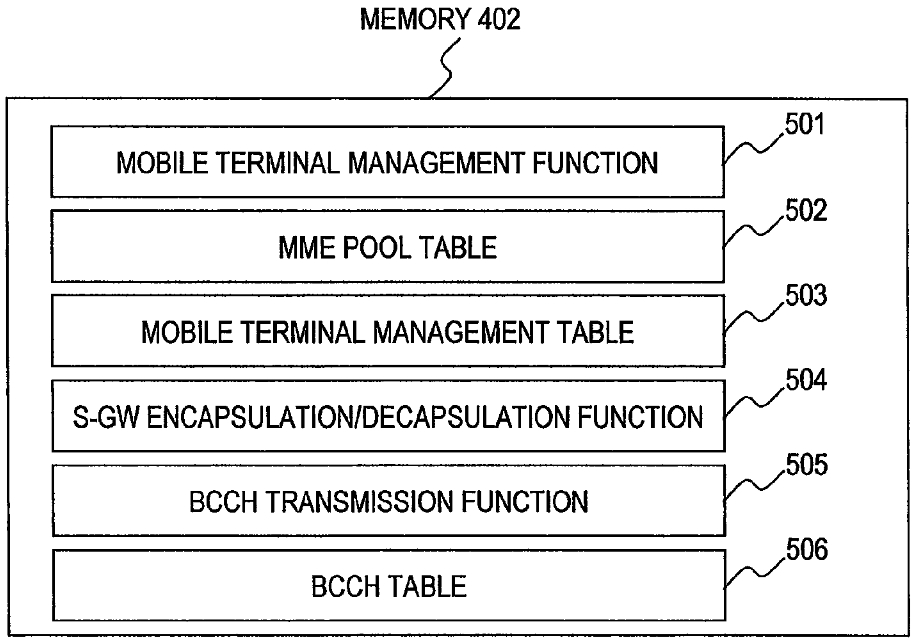
FIG. 5 is an explanatory diagram illustrating an example of a configuration of software of the base station according to the first embodiment of this invention.

FIG. 5 is an explanatory diagram illustrating an example of a configuration of software of the base station according to the first embodiment of this invention.

FIG. 5 illustrates the various programs and tables stored in the memory 402 illustrated in FIG. 4. It should be noted that each of the functions is implemented by the CPU 401 illustrated in FIG. 4 executing each of the programs stored in the memory 402.

A mobile terminal management function 501 is a program for managing the user entity 101 that communicates with the base station 102. The mobile terminal management function 501 processes a control signal between the base station 102 and the user entity 101 and a control signal between the base station 102 and the MME 103 that accommodates the user entity 101.

An MME pool table 502 is a table that describes information on the MMEs 103 that belong to the MME pool 105. The details of the MME pool table 502 are described later with reference to FIG. 6.

When the user entity 101 which is not accommodated in the MME 103 makes a first connection, or when the user entity 101 accommodated in the MME 103 for managing an area irrelevant to an area in which the base station 102 is located makes a connection, the mobile terminal management function 501 references the MME pool table 502 to select the MME 103 that accommodates the connected user entity 101 and assign the selected MME 103 to the user entity 101.

The mobile terminal management table 503 is a table that describes information for transmission/reception of the IP packet and the tunneling. The mobile terminal management function 501 references the mobile terminal management table 503 to execute the processing related to the user entity 101.

An S-GW encapsulation/decapsulation function 504 is a program of a processing for GRE-encapsulation/decapsulation. When the IP packet transmitted from the user entity 101 is forwarded to the S-GW 104, the S-GW encapsulation/decapsulation function 504 references the mobile terminal management table 503 to GRE-encapsulate/decapsulate the IP packet.

A broadcasting control channel (BCCH) transmission function 505 is a program for broadcasting. The broadcasting control channel (BCCH) transmission function 505 periodically broadcasts information (for example, tracking area ID) on a cell to the user entities 101 within the cell of the base station 102. A BCCH table 506 is a table for setting information to be broadcast by the broadcasting control channel.

Figures 6, 7:
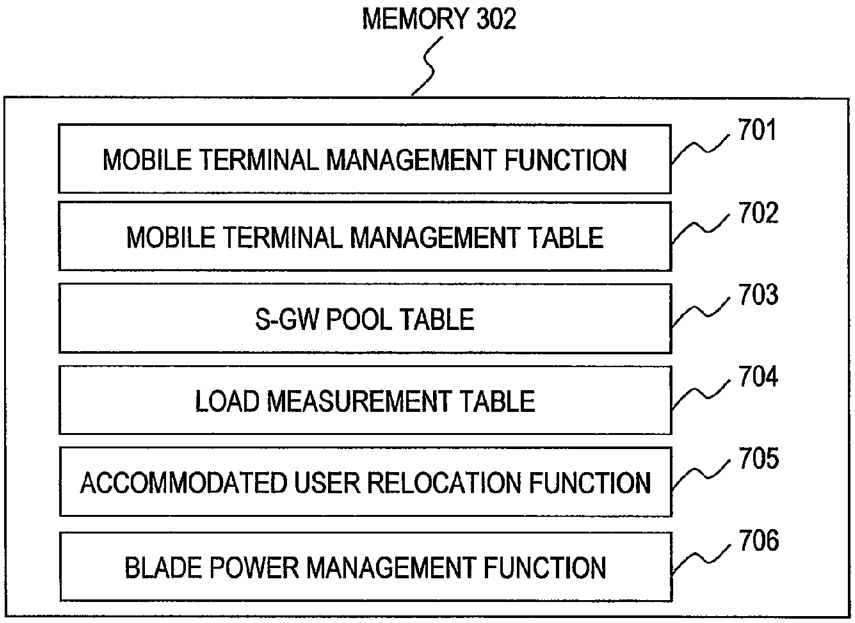
FIG. 6 is an explanatory table illustrating an example of a structure of an MME pool table according to the first embodiment of this invention.
FIG. 7 is an explanatory diagram illustrating an example of a configuration of software of the MME according to the first embodiment of this invention.

FIG. 6 is an explanatory table illustrating an example of a structure of an MME pool table according to the first embodiment of this invention.

The base station 102 includes the MME pool table 502. The MME pool table 502 includes an MME name 601, an MME identifier 602, an IP address 603, and a weighting parameter 604.

The MME name 601 is a name of the MME 103 included in the MME pool 105. The MME identifier 602 is an identifier for uniquely identifying the MME 103. The IP address 603 is an IP address given to the MME 103. The weighting parameter 604 is a parameter used as a priority for selection in a case where the base station 102 selects the MME 103 that accommodates the user entity 101.

For example, in order to prevent "mme1" described in the MME pool table 502 from being selected, it may be indicated that "mme1" is not a subject of the selection by setting the weighting parameter 604 of an entry of "mme1" to, for example, "0". It should be noted that the base station 102 may delete the entry of "mme1" in order to prevent "mme1" from being selected.

Further, the base station 102 may set the weighting parameter 604 to, for example, a negative value. If a connection request is received from the user entity 101 accommodated in the MME 103 with the weighting parameter 604 being negative, the base station 102 may select the MME 103 given a weighting parameter having a larger value and newly assign the selected MME 103 to the user entity 101. This allows the base station 102 to select the MME 103 to be assigned to the user entity 101 based on the weighting parameter. In other words, the base station 102 (MME 103) can reaccommodate the user entity 101 from the MME 103 having a low weighting parameter to the MME 103 having a high weighting parameter.

It should be noted that the weighting parameter 604 may be set by the MME 103 or the monitor management control blade 203 based on load information stored in a load measurement table described later with reference to FIG. 7, or may be set by another system that manages the monitor management control blade 203 based on an administrator's instruction.

FIG. 7 is an explanatory diagram illustrating an example of a configuration of software of the MME according to the first embodiment of this invention.

FIG. 7 illustrates the programs and tables stored in the memory 302 of the CPU blade 201 illustrated in FIG. 3 which operates as the MME 103. It should be noted that each of the functions is implemented by the CPU 301 illustrated in FIG. 3 executing each of the programs stored in the memory 302.

A mobile terminal management function 701 is a program for managing the user entity 101. A mobile terminal management table 702 is used for management of each of the user entity 101. An S-GW pool table 703 includes information on the S-GWs 104 that belong to the S-GW pool 106. The MME 103 references the S-GW pool table 703 to select the S-GW 104 that accommodates the user entity 101 and assign the selected S-GW 104 to the user entity 101.

A load measurement table 704 includes information on the loaded state of the MME 103. It should be noted that details of the load measurement table 704 are described later with reference to FIG. 8. An accommodated user relocation function 705 is a program for relocating a user (user entity 101) accommodated in the MME 103 to another MME 103. A blade power management function 706 is a program for managing a power source state of the CPU blade 201 that operates as the MME 103 and causing a switch to the power-saving state by turning off the power source or effecting the sleep state.

Figures 8, 9:
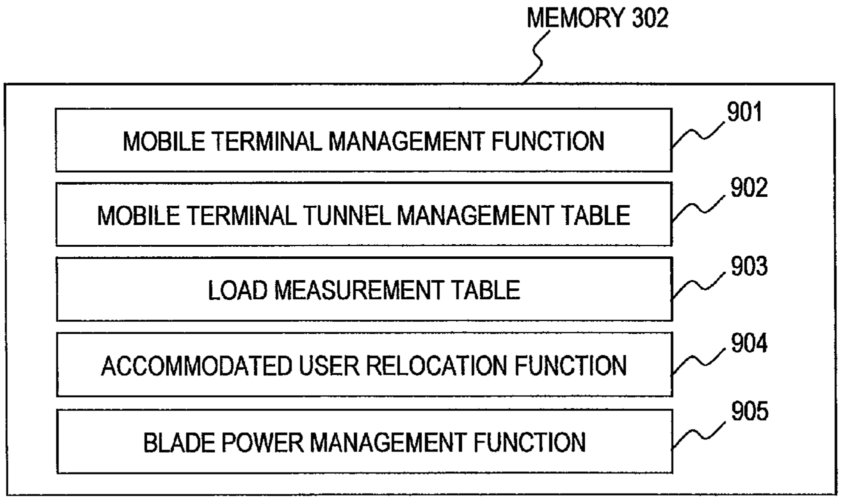
FIG. 8 is an explanatory table illustrating an example of a structure of a load measurement table for the MME according to the first embodiment of this invention.
FIG. 9 is an explanatory diagram illustrating an example of a configuration of software of an S-GW according to the first embodiment of this invention.

FIG. 8 is an explanatory table illustrating an example of a structure of a load measurement table for the MME according to the first embodiment of this invention.

The load measurement table 704 that stores results from measuring the loads on the MMEs 103 includes an MME name 801, an accommodated mobile terminal count 802, a signal processing count 803, a paging count 804, an active user count 805, a CPU usage ratio 806, and a tracking area update count 807.

The MME name 801 is a name of the MME 103. The accommodated mobile terminal count 802 is the number of user entities 101 accommodated in the MME 103 at a time point when the measurement is performed. The signal processing count 803 is the number of processings performed on control signals within a fixed time (for example, 1 minute). Here, the term "control signal" represents a signal of the tracking area update request, simultaneous paging, a signal for the tunnel control, or the like. The paging count 804 is the number of times that the paging is executed within the fixed time (for example, 1 minute). The active user count 805 is the number of user entities 101 (users) that are in the active state among the accommodated user entities 101 (users). The CPU usage ratio 806 is an usage ratio of the CPU 301 within the fixed time. The tracking area update count 807 is the number of times that the tracking area update is processed within the fixed time.

It should be noted that the MME 103 may describe not only the load information on itself ("mme1") but also the load information acquired from a plurality of other MMEs 103 as the entries of the load measurement table 704 included in itself.

FIG. 9 is an explanatory diagram illustrating an example of a configuration of software of the S-GW according to the first embodiment of this invention.

FIG. 9 illustrates the programs and tables stored in the memory 302 of the CPU blade 201 illustrated in FIG. 3 which operates as the S-GW 104. It should be noted that each of the functions is implemented by the CPU 301 illustrated in FIG. 3 executing each of the programs stored in the memory 302.

A mobile terminal management function 901 is a program for managing the user entity 101. A mobile terminal tunnel management table 902 includes a GRE tunnel set between the base station 102 and the S-GW 104 and information for managing the PMIP tunnel or the GTP tunnel set between the S-GW 104 and the P-GW 107.

A load measurement table 903 includes information on the loaded state of the S-GW 104. It should be noted that details of the load measurement table 903 are described later with reference to FIG. 10. An accommodated user relocation function 904 is a program for relocating the user (user entity 101) accommodated in the S-GW 104 to another S-GW 104. A blade power management function 905 is a program for managing a power source state of the CPU blade 201 that operates as the S-GW 104 and causing a switch to the power-saving state by turning off the power source or effecting the sleep state.

FIG. 10 is an explanatory table illustrating an example of a structure of the load measurement table of the S-GW according to the first embodiment of this invention.

The load measurement table 903 that stores results from measuring the loads on the S-GW 104 includes an S-GW name 1001, an accommodated mobile terminal count 1002, a signal processing count 1003, an active user count 1004, a CPU usage ratio 1005, a forwarded packet count 1006, and a forwarded byte count 1007.

The S-GW name 1001 is a name of the S-GW 104. The accommodated mobile terminal count 1002 is the number of user entities 101 accommodated in the S-GW 104 at the time point when the measurement is performed. The signal processing count 1003 is the number of processings performed on control signals within a fixed time (for example, 1 minute). The active user count 1004 is the number of user entities 101 (users) that are in the active state among the accommodated user entities 101 (users). The CPU usage ratio 1005 is an usage ratio of the CPU 301 within the fixed time. The forwarded packet count 1006 is the number of packets forwarded by the S-GW 104 within the fixed time. The forwarded byte count 1007 is a total number of bytes of the packets forwarded by the S-GW 104 within the fixed time.

Hereinafter, description is made of a relocation processing, in other words, a processing for reaccommodating the user entity 101 accommodated in the CPU blade 201 that operates as the MME 103 or the S-GW 104 into another CPU blade 201.

Figure 11:
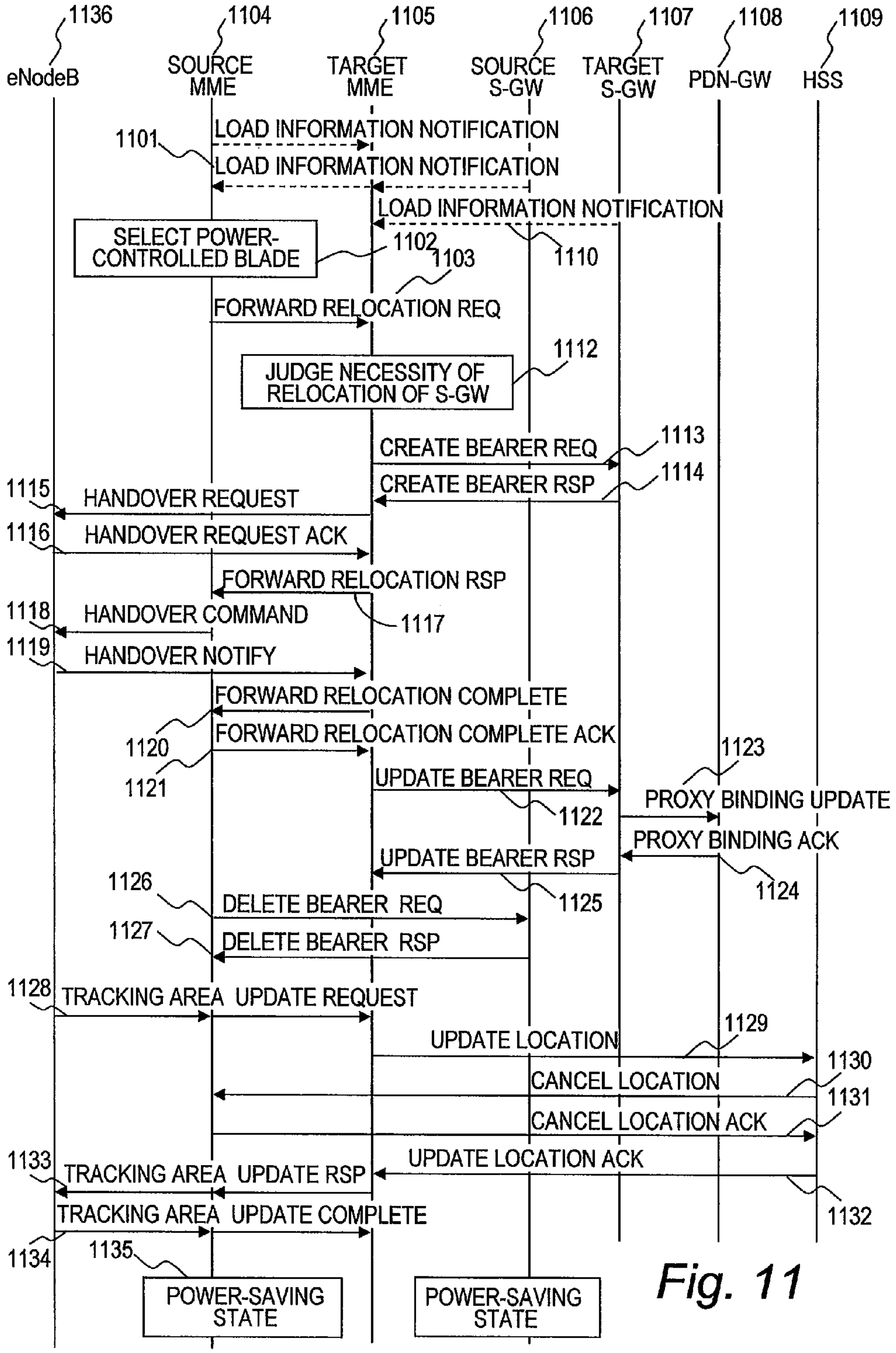
FIG. 11 is a sequential diagram illustrating a processing for relocation of the user entity in the active state according to the first embodiment of this invention.

FIG. 11 is a sequential diagram illustrating a processing for relocation of the user entity in the active state according to the first embodiment of this invention.

A base station (eNodeB) 1136 is the base station 102 that has a connection to the user entity 101 performing communications. A source MME (relocation source MME) 1104 is the MME 103 that accommodates the user entity 101 before the relocation processing. A target MME (relocation target MME) 1105 is the MME 103 that accommodates the user entity 101 after the relocation processing. A source S-GW (relocation source S-GW) 1106 is the S-GW 104 that accommodates the user entity 101 before the relocation processing. A target S-GW (relocation target S-GW) 1107 is the S-GW 104 that accommodates the user entity 101 after the relocation processing. A PDN-GW (P-GW) 1108 is the P-GW 107 that provides the user entity 101 with a service. A home subscriber server (HSS) 1109 is a server for managing the location of the user entity 101.

First, the CPU blades 201 that operate as the MMEs 103 periodically exchange the messages on the load information with one another (1101). It should be noted that the messages on the load information may not only be exchanged between the CPU blades 201 but also be exchanged between each of the CPU blades 201 and the monitor management control blade 203.

Here, a message on the load information to be exchanged includes the contents of the load measurement table 704 illustrated in FIG. 8. Specifically, the contents includes information on each of the CPU blades operating as the MMEs 103, in other words, the accommodated mobile terminal count 802, the signal processing count 803 of the control signal processed within the fixed time, the paging count 804 of the paging executed within the fixed time, the active user count 805 in radio communication, the CPU usage ratio 806, and the tracking area update count 807. The message on the load information is used by the MME 103 for selecting the CPU blade 201 which is to switch to the power-saving state. Further, the MME 103 (relocation target MME 1105) may exchange the message on the load information with each of the S-GWs 104 (1110).

Each of the CPU blades 201 that operate as the MMEs 103 calculates the estimated value of the load on each of the CPU blades 201 based on the load information exchanged between the CPU blades 201. The estimated values of the loads are calculated based on the number of processings of the control signal processed by the CPU blade 201 within the fixed time, the number of times that the paging is executed within the fixed time, the number of users in radio communication, the CPU usage ratio, the tracking area update count, and the like.

Subsequently, if the estimated value of the load on the CPU blade 201 (MME 103) becomes equal to or smaller than a predetermined threshold value or if the estimated value of the load on the CPU blade 201 (MME 103) becomes the lowest among the estimated values of the loads on the other CPU blades 201 (MMEs 103), the CPU blade 201 (MME 103) decides to switch to the power-saving state (1102). Further, the CPU blade 201 (MME 103) may switch to the power-saving state if the number of the user entities 101 accommodated in itself becomes smaller than a predetermined number.

It should be noted that the monitor management control blade 203 may calculate the estimated value of the load on each of the CPU blades 201 (MMEs 103) based on the message on the load information acquired from each of the CPU blades 201 (MMEs 103), compare the estimated values of the loads that have been calculated with one another, and select the CPU blade 201 (MME 103) having the smallest estimated value of the load as the CPU blade which is to switch to the power-saving state (1102).

Further, the CPU blade 201 which is to switch to the power-saving state at a predetermined time of day (for example, in the middle of the night) may be determined in advance. Further, the monitor management control blade 203 may estimate the load on the whole servers based on the load information acquired from each of the blades, and if the estimated load has a smaller value than a predetermined threshold value, the CPU blade 201 determined in advance may switch to the power-saving state. The CPU blade 201 (MME 103) selected so as to switch to the power-saving state corresponds to the relocation source MME 1104.

It should be noted that the relocation source MME 1104 or the monitor management control blade 203 may change the weighting parameter of the relocation source MME 1104 which is to switch to the power-saving state, and notify the base station 1136 that the weighting parameter has been changed. In this case, the base station 1136 changes the weighting parameter 604 described in the MME pool table 502. Further, the system that operates and manages the monitor management control blade 203 may change the weighting parameter based on the administrator's instruction.

Subsequently, the relocation source MME 1104 which is to switch to the power-saving state (for example, the MME 103 judged to have the smallest estimated value of the load) starts a processing (relocation processing) for reaccommodating the accommodated user entity 101 (user) into another MME 103. Here, the base station 1136 implements the relocation processing by executing a processing for dummy handover from the relocation source MME 1104 to the relocation target MME 1105 on the connected user entity 101. Here, the term "dummy handover" represents a processing of changing the MME 103 or the S-GW 104 at a connection target (accommodation target) of the user entity 101 without changing the base station 102 at the connection target of the user entity 101.

The base station 1136 selects the relocation target MME 1105 which is to newly accommodate in the connected user entity 101 based on the weighting parameter 604 described in the MME pool table 502.

It should be noted that the relocation source MME 1104 may execute the above-mentioned processing for the dummy handover based on a schedule determined in advance (for example, when the predetermined time of day is reached) to reaccommodate the user entity 101 (user) accommodated in the CPU blade 201 into another CPU blade 201 (relocation target MME 1105) and to switch the CPU blade 201 (relocation source MME 1104) to the power-saving state by controlling the power source thereof.

Subsequently, the relocation source MME 1104 notifies the relocation target MME 1105 of a start of the relocation (processing of changing the MME 103 that accommodates the user entity 101) (1103).

Subsequently, the relocation target MME 1105 judges whether or not the S-GW 104 that accommodates the user entity 101 needs to be changed (1112). If it is judged that the S-GW 104 needs to be changed, the relocation target MME 1105 executes the relocation processing (processing of changing the S-GW 104 that accommodates the user entity 101) on the S-GW 104.

It should be noted that in Step 1110, the relocation target MME 1105 judges based on the load information acquired from each of the S-GWs 104 whether or not the S-GW 104 that accommodates the user entity 101 is to be changed. Further, the monitor management control blade 203 or the MME 103 in the in-service state may judge based on the load information acquired from each of the S-GWs 104 whether or not the S-GW 104 that accommodates the user entity 101 is to be changed. Further, the S-GW 104 which is to switch to the power-saving state may be determined in advance according to a predetermined schedule.

The above-mentioned load information on each of the S-GWs 104 includes the contents of the load measurement table on the S-GW 104 illustrated in FIG. 10. Specifically, the load information includes the S-GW name 1001, the accommodated mobile terminal count 1002, the signal processing count 1003 of the control signal processed within the fixed time, the active user count 1004 in radio communication, the CPU usage ratio 1005 within the fixed time, the forwarded packet count 1006 within the fixed time, and the forwarded byte count 1007 within the fixed time.

To execute the relocation processing on the S-GW 104, the relocation target MME 1105 requests the relocation target S-GW 1107 to create the GRE tunnel between the relocation target S-GW 1107 and the base station 102 (1113). The relocation target S-GW 1107 notifies the relocation target MME 1105 of information on the GRE tunnel to be newly created (1114).

Here, the S-GW 104 that accommodates the user entity 101 has been changed, and hence the relocation target MME 1105 then requests the base station 1136 to change the S-GW 104 at the connection target by the dummy handover (1115).

The base station 1136 notifies the relocation target MME 1105 that the base station 1136 is now ready to change the S-GW 104 at the connection target (1116). In addition, the relocation target MME 1105 notifies the relocation source MME 1104 that the relocation target MME 1105 is now ready for the dummy handover (1117).

Subsequently, the relocation source MME 1104 requests the base station 1136 to start the dummy handover (1118). The base station 1136 notifies the relocation target MME 1105 that the dummy handover has been completed (1119).

Subsequently, the relocation target MME 1105 notifies the relocation source MME 1104 that the dummy handover has been successful (1120), and obtains an acknowledgment from the relocation source MME 1104 (1121). The relocation target MME 1105 notifies the relocation target S-GW 1107 that the dummy handover has been completed. In addition, the relocation target MME 1105 requests the relocation target S-GW 1107 to set a tunnel (1122). The relocation target S-GW 1107 sets a tunnel between the base station 1136 and the relocation target S-GW 1107.

The relocation target S-GW 1107 notifies the P-GW 1108 that the S-GW 104 that accommodates the user entity 101 has been changed and of the information on the newly set tunnel (1123). The P-GW 1108 notifies the relocation target S-GW 1107 that the tunnel information has been received (1124). Further, the relocation target S-GW 1107 notifies the relocation target MME 1105 that the tunnel has been successfully created (1125).

The relocation source MME 1104 requests the relocation source S-GW 1106 to delete the accommodated user entity 101 (user) (1126). The relocation source S-GW 1106 notifies the relocation source MME 1104 that the accommodated user entity 101 (user) has been deleted (1127). Here, because the accommodated MME 103 has been changed, the user entity 101 makes a tracking area update request via the base station 1136 (1128).

The relocation target MME 1105 forwards the tracking area update request made by the user entity 101 to the home subscriber server (HSS) 1109 (1129). The home subscriber server 1109 requests the relocation source MME 1104 to delete the information on the user entity 101 (1130). The relocation source MME 1104 deletes the information on the user entity 101, and notifies the home subscriber server 1109 that the information on the user entity 101 has been deleted (1131).

The home subscriber server 1109 notifies the relocation target MME 1105 that the tracking area update of the user entity 101 has been completed and of the information on the user entity 101 that has been subjected to the new tracking area update (1132). The relocation target MME 1105 notifies the base station 1136 (user entity 101) that the tracking area update has been completed (1133). The base station 1136 notifies the relocation target MME 1105 that the notification has been received (1134).

The relocation source MME 1104 and the relocation source S-GW 1106 repeatedly perform the above-mentioned relocation processing on each of the accommodated user entities 101 to relocate the user entity 101 in communication. In addition, after the user entity 101 in the idle state has been relocated, the relocation source MME 1104 and the relocation source S-GW 1106 switch to the power-saving state (1135).

In the mobile communication system according to the first embodiment, the switch to the power-saving state may be caused by interrupting the power source by using the IPMC 305 and the power relay 307, or the switch to the power-saving state may be caused by effecting the sleep state by reducing or stopping a clock of the CPU. Further, in a case where a multicore processor is used, the switch to the power-saving state may be caused by cutting down the number of running cores.

It should be noted that in the first embodiment, the example of reaccommodating the user entity 101 in communication is illustrated, but in a case where the user entity 101 is in the idle state, a paging processing (paging) is executed to temporarily bring the user entity 101 into the active state, and then the MME 103 and the S-GW 104 that are accommodated are changed by the above-mentioned processing for the dummy handover. The processing of reaccommodating the user entity 101 in the idle state is described later by referring to FIG. 15.

Figure 13A:
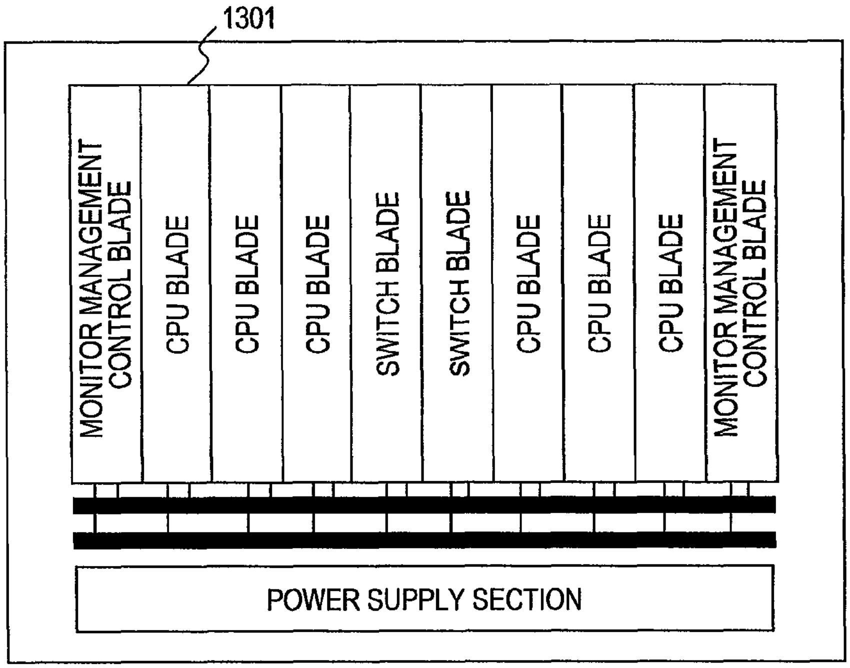
FIG. 13A is an explanatory diagram illustrating blade servers under an in-service state operation according to the first embodiment of this invention.
Figure 13B:
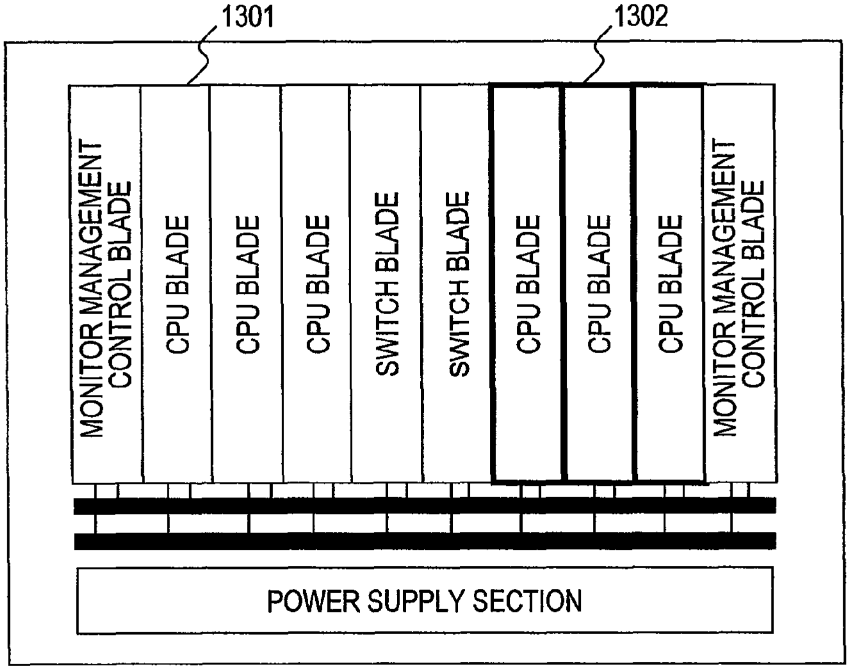
FIG. 13B is an explanatory diagram illustrating blade servers under a power-saving state operation according to the first embodiment of this invention.

FIG. 13A is an explanatory diagram illustrating blade servers under an in-service state operation and FIG. 13B is an explanatory diagram illustrating blade servers under a power-saving state operation according to the first embodiment of this invention.

A CPU blade 1301 is the CPU blade 201 in the in-service state. A CPU blade 1302 is the CPU blade 201 in the power-saving state. In the in-service state operation (FIG. 13A), all the blades are in the in-service state. In the power-saving state operation (FIG. 13B), the CPU blade 1302 is in the state in which the clock of the CPU has been reduced or the sleep state in which the clock has been stopped. Further, in the case of using the multicore processor, the CPU blade 1302 is in the state in which the number of the running cores has been reduced or the state in which the power source has been interrupted.

It should be noted that the power-saving state operation (FIG. 13B) represents the operation state of the blade after having relocated the users accommodated therein to another CPU blade 201 for the switch to the power-saving state, in other words, the state of Step 1135 illustrated in FIG. 11 (Step 1235 illustrated in FIG. 12) and the subsequent steps.

Figure 14:
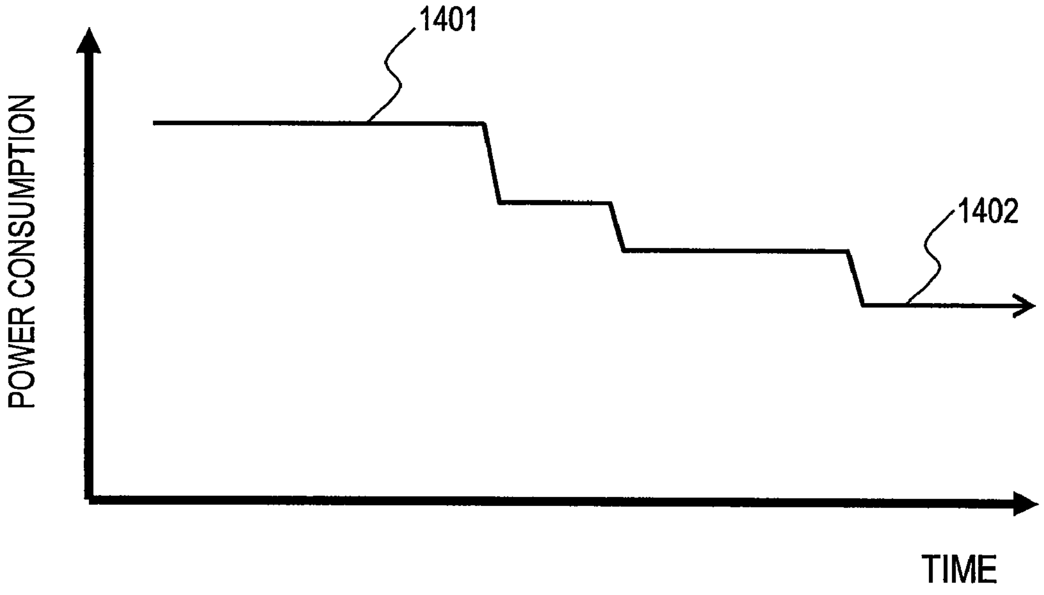
FIG. 14 is an explanatory graph illustrating an example of transition of power consumption according to the first embodiment of this invention.

FIG. 14 is an explanatory graph illustrating an example of transition of power consumption according to the first embodiment of this invention.

FIG. 14 illustrates a state in which the power consumption decreases each time the CPU blade 201 switches to the power-saving state sequentially in the process of switching from the in-service state operation (FIG. 13A) illustrated in FIG. 13 to the power-saving state operation (FIG. 13B). A power consumption 1401 represents power consumption in the in-service state operation illustrated in FIG. 13A. A power consumption 1402 represents power consumption in a case where each CPU blade 201 switches to the power-saving state operation illustrated in FIG. 13B after having relocated the user (user entity 101) accommodated therein to anther CPU blade 201.

As described above, according to the first embodiment, by the processing for the dummy handover, the mobile communication system relocates the user entity in the active state (in communication) from one mobility management entity to another mobility management entity (and one service gateway to another service gateway), and switches the mobility management entity and the service gateway to the power-saving state, which makes it possible to reduce the power consumption.

Further, the base station can appropriately select the mobility management entity and the service gateway that are to accommodate the user entity based on the weighting parameters described in the pool tables of the mobility management entity and the service gateway.

Second Embodiment

Hereinafter, description is made of a processing of reaccommodating the user entity 101 in the idle state accommodated in the CPU blade 201 that operates as the MME 103 (and the S-GW 104) into another CPU blade 201.

Figure 12:
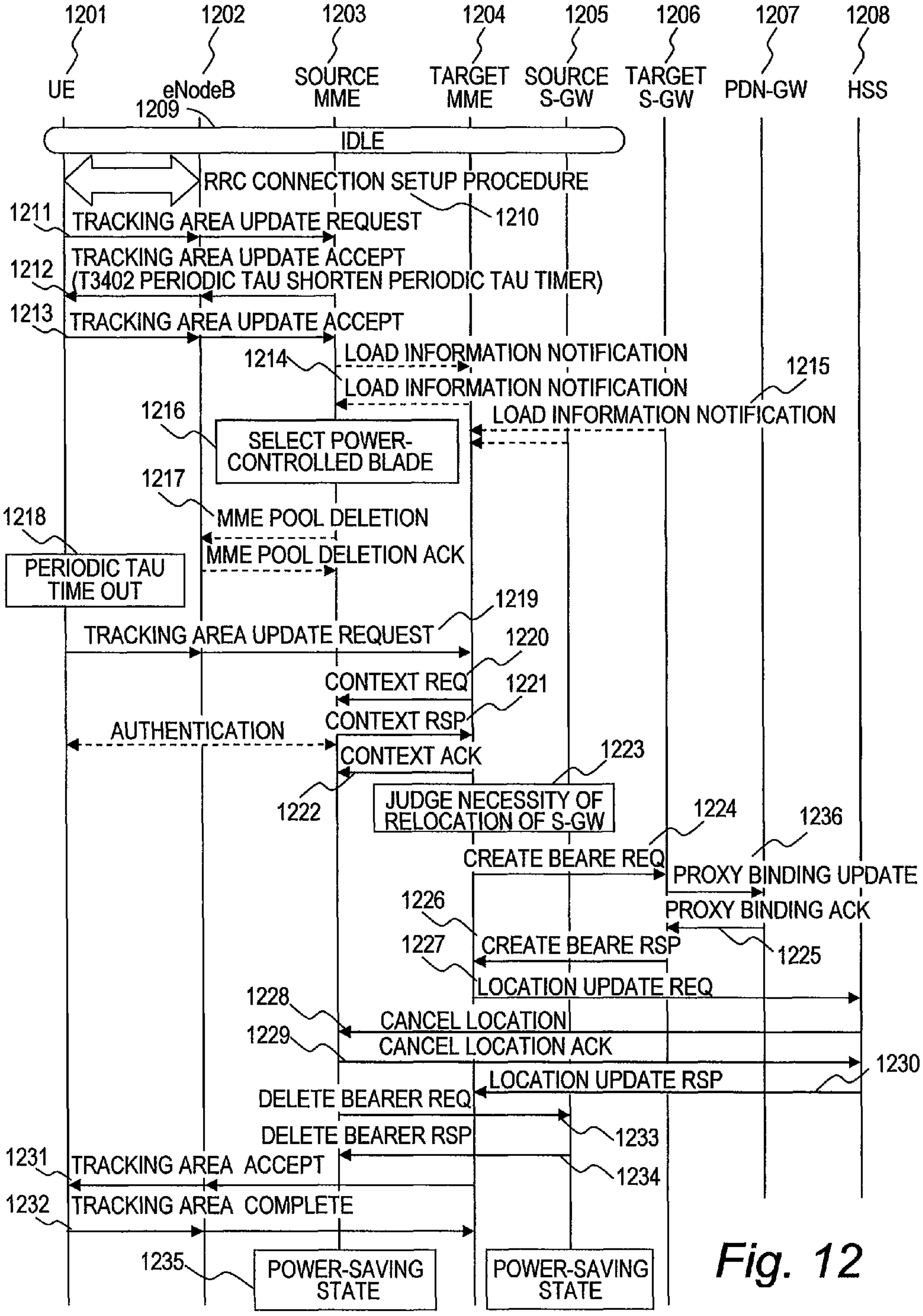
FIG. 12 is a sequential diagram illustrating a processing for relocation of the user entity in the idle state according to a second embodiment of this invention.

FIG. 12 is a sequential diagram illustrating a processing for relocation of the user entity in the idle state according to a second embodiment of this invention.

A user entity (UE) 1201 is the user entity 101 in the idle state. A base station (eNodeB) 1202 is the base station 102 that communicates with the user entity 1201. A source MME 1203 is the MME 103 at the relocation source. A target MME 1204 is the MME 103 at the relocation target. A source S-GW 1205 is the S-GW 104 at the relocation source. A target S-GW 1206 is the S-GW 104 at the relocation target. A P-GW 1207 is the P-GW 107 that provides the user entity 1201 with a service. A home subscriber server (HSS) 1208 is a server for managing the location of the user entity 1201.

First, the user entity 1201 is in the idle state (1209). The user entity 1201 includes a periodic TAU timer for periodically executing the tracking area update. The user entity 1201 makes a tracking area update request when the timer times out.

The user entity 1201 and the base station 1202 set a radio link for a processing for the tracking area update (1210). The user entity 1201 periodically requests the relocation source MME 1203 for the tracking area update via the base station 1202 based on a value set in the periodic TAU timer (1211).

The relocation source MME 1203 notifies the user entity 1201 via the base station 1202 that a tracking area update request has been received. In this case, the relocation source MME 1203 notifies the user entity 1201 of the next value of the periodic TAU timer (1212).

It should be noted that the relocation source MME 1203 sets the value of the timer to a value smaller than usual if a timing to switch to the power-saving state has neared, and notifies the user entity 1201 of the set value. It should be noted that if a time of day to switch to the power-saving state is determined in advance, the value of the timer may be changed based on a predetermined schedule.

Upon reception of the above-mentioned notification, the user entity 1201 sets the value of the periodic TAU timer, and notifies the relocation source MME 1203 via the base station 1202 that the value of the timer has been set (1213).

The CPU blades 201 (relocation source MME 1203 and relocation target MME 1204) that operate as the MMEs 103 periodically exchange the messages on the load information in order to select the CPU blade 201 which is to enter the power-saving state by controlling the power source (1214). Further, the MME 103 (relocation target MME 1204) may exchange the messages on the load information with each S-GW 104 (1215).

It should be noted that the messages on the load information may not only be exchanged between the CPU blades 201 but also be exchanged between each of the CPU blades 201 and the monitor management control blade 203. Here, the message on the load information to be exchanged includes the contents of the load measurement table 704 illustrated in FIG. 8. Specifically, the message includes the load information on each of the CPU blades operating as the MMEs 103, in other words, the accommodated mobile terminal count 802, the signal processing count 803 of the control signal processed within the fixed time, the paging count 804 of the paging executed within the fixed time, the active user count 805 in radio communications, the CPU usage ratio 806, and the tracking area update count 807.

Subsequently, the CPU blade 201 which is to switch to the power-saving state is selected (1216). Each of the CPU blades 201 that operate as the MMEs 103 calculates the estimated value of the load on each of the CPU blades 201 based on the load information exchanged between the CPU blades 201. The estimated values of the loads are calculated based on the number of processings of the control signal processed by the CPU blade 201 within the fixed time, the number of times that the paging is executed within the fixed time, the number of users in radio communication, a total sum of the CPU usage ratios, the tracking area update count, and the like.

Subsequently, if the estimated value of the load on the CPU blade 201 (MME 103) becomes equal to or smaller than a predetermined threshold value or if the estimated value of the load on the CPU blade 201 (MME 103) becomes the lowest among the estimated values of the loads on the other CPU blades 201 (MMEs 103), the CPU blade 201 (MME 103) decides to switch to the power-saving state (1214). It should be noted that the monitor management control blade 203 may calculate the estimated value of the load on each of the CPU blades 201 (MMEs 103) based on the message on the load information acquired from each of the CPU blades 201 (MMEs 103), compare the estimated values of the loads that have been calculated with one another, and select the CPU blade 201 (MME 103) having the lowest estimated value of the load as the CPU blade which is to switch to the power-saving state (1102). Further, the CPU blade 201 (MME 103) may switch to the power-saving state if the number of the user entities 1201 accommodated in itself becomes smaller than a predetermined number.

Further, the CPU blade which is to switch to the power-saving state at a predetermined time of day (for example, in the middle of the night) may be determined in advance. Further, the monitor management control blade 203 may estimate the load on the whole servers based on the load information acquired from each of the blades, and if the estimated load has a smaller value than a predetermined threshold value, the CPU blade 201 determined in advance may switch to the power-saving state. The CPU blade 201 (MME 103) which is to switch to the power-saving state corresponds to the relocation source MME 1104.

The CPU blade 201 (in other words, relocation source MME 1203) which is to switch to the power-saving state requests each base station 1202 to delete its own entry from the MME pool table 502 included in each base station 1202 illustrated in FIG. 6 or to set the weighting parameter to "0" therein in order to prevent itself from being selected as the MME 103 at the accommodation target (1217).

Therefore, a terminal in the idle state accommodated in the relocation source MME 1203 is accommodated into another CPU blade 201 (in other words, relocation target MME 1204) at the next tracking area update. It should be noted that a processing of changing the MME pool table 502 performed in Step 1217 may be executed by the relocation source MME 1203 or may be executed by another system managing the monitor management control blade 203 based on the administrator's instruction.

Here, when the periodic TAU timer times out (1218), the user entity 1201 starts the tracking area update. First, the user entity 1201 transmits a tracking area update request to the base station 1202 (1219). The tracking area update request includes the GUTI assigned by the relocation source MME 1203 accommodating the user entity 1201 at the present time, and hence the base station 1202 can identify the MME 1203 accommodating the user entity 1201.

However, according to the MME pool table 502 included in the base station 1202, the MME 1203 which is to switch to the power-saving state is prevented from being selected (1217), and hence the base station 1202 selects a new MME, in other words, the relocation target MME 1204 from the MME pool table 502, and forwards the tracking area update request transmitted from the user entity 1201 to the selected relocation target MME 1204 (1219).

The relocation target MME 1204 which is to newly accommodate the user entity 1201 requests the relocation source MME 1203 to transmit context information on the user entity 1201 (1220), and acquires the context information on the user entity 1201 transmitted from the relocation source MME 1203 (1221). The relocation target MME 1204 notifies the relocation source MME 1203 that the context information has been acquired (1222). Here, the term "context information" represents information used by the MME 1204 for authenticating the user entity 1201. Based on the acquired context information, the relocation target MME 1204 authenticates and accommodates the user entity 1201.

Subsequently, the relocation target MME 1204 judges whether or not the S-GW 104 accommodating the user entity 1201 needs to be changed (1223). If it is judged that the S-GW 104 needs to be changed, the relocation processing for the S-GW 104 is executed.

It should be noted that in Step 1215, the relocation target MME 1105 judges based on the load information acquired from each of the S-GWs 104 whether or not the S-GW 104 that accommodates the user entity 101 is to be changed (whether or not the S-GW 104 needs to be relocated). Further, the monitor management control blade 203 or the MME 103 in the in-service state may judge based on the load information acquired from each of the S-GWs 104 whether or not the S-GW 104 that accommodates the user entity 101 is to be changed. Further, the S-GW 104 which is to switch to the power-saving state may be determined in advance according to a predetermined schedule.

It should be noted that the above-mentioned load information on each of the S-GWs 104 includes the contents of the load measurement table on the S-GW 104 illustrated in FIG. 10. Specifically, the load information includes the S-GW name 1001, the accommodated mobile terminal count 1002, the signal processing count 1003 of the control signal processed within the fixed time, the active user count 1004 in radio communication, the CPU usage ratio 1005 within the fixed time, the forwarded packet count 1006 within the fixed time, and the forwarded byte count 1007 within the fixed time.

Subsequently, to execute the relocation of the S-GW 104, the relocation target MME 1204 requests the relocation target S-GW 1206 to newly accommodate the user entity 1201 and to further set a tunnel between the base station 1202 and the relocation target S-GW 1206 (1224).

The relocation target S-GW 1206 notifies the P-GW 1207 that the S-GW 104 accommodating the user entity 1201 has been changed and of the new tunnel information (1236). The P-GW 1207 notifies the S-GW 1206 that the new tunnel information has been received (1225). The relocation target S-GW 1206 notifies the relocation target MME 1204 that the tunnel has been successfully created (1226).

Subsequently, the relocation target MME 1204 requests the home subscriber server 1208 for the tracking area update of the user entity 1201 (1227). The home subscriber server 1208 requests the relocation source MME 1203 to delete the information on the user entity 1201 (1228). The relocation source MME 1203 deletes the information on the user entity 1201, and notifies the home subscriber server 1208 that the information on the user entity 1201 has been deleted (1229).

The home subscriber server 1208 notifies the relocation target MME 1204 that the tracking area update has been completed and of the newly registered information on the user entity 1201 (1230). Subsequently, the relocation source MME 1203 requests the relocation source S-GW 1205 to delete an entry of the user entity 1201 for the tunnel (1233). The relocation source S-GW 1205 deletes the entry of the user entity 1201 for the tunnel, and notifies the relocation source MME 1203 that the processing for deletion has been completed (1234).

Subsequently, the relocation target MME 1204 notifies the user entity 1201 via the base station 1202 that the tracking area update has been completed (1231). The user entity 1201 notifies the relocation target MME 1204 that the above-mentioned notification has been received (1232). The relocation source MME 1203 (or relocation source S-GW 1205) repeatedly performs the above-mentioned processing to thereby relocate the user entity 1201 accommodated by itself to another MME 103 (or S-GW 104) and then switch to the power-saving state (1235).

It should be noted that in the mobile communication system according to the second embodiment, in the same manner as in the first embodiment, the switch to the power-saving state may be caused by interrupting the power source by using the IPMC 305 and the power relay 307, or the switch to the power-saving state may be caused by effecting the sleep state by reducing or stopping the clock of the CPU. Further, in the case where the multicore processor is used, the switch to the power-saving state may be caused by cutting down the number of running cores.

As described above, according to the second embodiment, by changing the value of the TAU timer, the mobility management entity which is to switch to the power-saving state can shorten the intervals at which the tracking area update request is received from the user entity in the idle state. The mobile communication system uses the tracking area update request received from the user entity in the idle state to thereby make it possible to change the mobility management entity (and service gateway) accommodating the user entity. Further, as in the same effect as the first embodiment, the base station can select the mobility management entity (or service gateway) accommodating the user entity based on the weighting parameters described in the pool tables of the mobility management entity and the service gateway. Further, as in the same effect as the first embodiment, the mobile communication system can reduce the power consumption by switching the mobility management entity and the service gateway to the power-saving state.

Third Embodiment

Hereinafter, description is made of a processing of relocating the user entity 101 in the idle state which is accommodated in each of the CPU blades 201 operating as the MMEs 103 (and S-GWs 104) to another CPU blade 201 by changing a tracking area ID (TAI) included in the broadcasting control channel (BCCH) transmitted from the base station 102.

Figure 15:
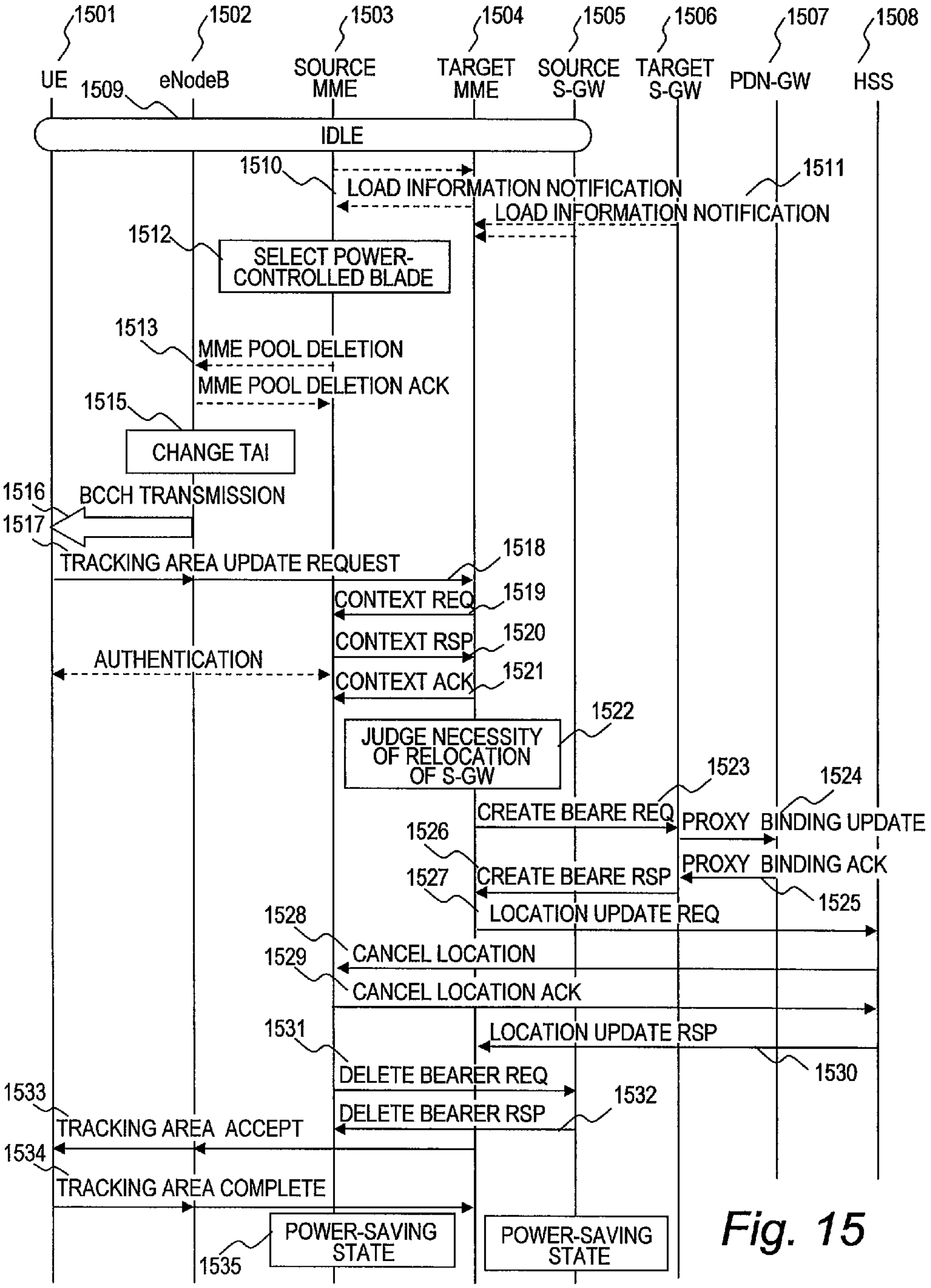
FIG. 15 is a sequential diagram illustrating a processing for relocation of the user entity in the idle state according to a third embodiment of this invention.

FIG. 15 is a sequential diagram illustrating a processing for relocation of the user entity in the idle state according to a third embodiment of this invention.

A user entity (UE) 1501 is the user entity 101 that executes the tracking area update based on a change of the tracking area ID (TAI) included in the received broadcasting control channel. A base station (eNodeB) 1502 is the base station 102 that changes the TAI of the broadcasting control channel. A source MME 1503 is the MME 103 at the relocation source. A target MME 1504 is the MME 103 at the relocation target. A source S-GW 1505 is the S-GW 104 at the relocation source. A target S-GW 1506 is the S-GW 104 at the relocation target. A P-GW 1507 is the P-GW 107 that provides the user entity 1501 with a service. A home subscriber server (HSS) 1508 is a server for managing the location of the user entity 1501.

The user entity 1501 acquires a tracking area list (TA list) including the tracking area ID (TAI) from the MME 1503 at a time of the tracking area update with respect to the MME 1503 accommodating the user entity 1501. Further, the base station 1502 transmits the TAI by the broadcasting control channel to the user entity 1501 located within the tracking area.

The user entity 1501 newly requests the tracking area update if the TAI included in the broadcasting control channel received from the base station 1502 is not included in the TA list included in itself. For example, if the user entity 1501 recovers from the idle state, the user entity 1501 learns that the user entity 1501 has moved to another tracking area from the TAI included in the broadcasting control channel received from the base station 1502, and newly requests the tracking area update.

The user entity 1501 periodically receives broadcasting control channel information transmitted from the base station 1502 in the idle state in which radio communications are not being performed (1509). Further, the CPU blades 201 that operate as the MMEs 103 periodically exchange the messages on the load information with one another (1510). It should be noted that the messages on the load information may not only be exchanged between the CPU blades 201 but also be exchanged between each of the CPU blades 201 and the monitor management control blade 203.

Here, a message on the load information to be exchanged includes the contents of the load measurement table 704 illustrated in FIG. 8. Specifically, the contents includes information on each of the CPU blades operating as the MMEs 103, in other words, the accommodated mobile terminal count 802, the signal processing count 803 of the control signal processed within the fixed time, the paging count 804 of the paging executed within the fixed time, the active user count 805 in radio communication, the CPU usage ratio 806, and the tracking area update count 807. The message on the load information is used for selecting the CPU blade 201 which is to switch to the power-saving state. Further, the MME 103 (relocation target MME 1105) may exchange the message on the load information with each of the S-GWs 104 (1511).

Each of the CPU blades 201 that operate as the MMEs 103 calculates the estimated value of the load on each of the CPU blades 201 based on the load information exchanged between each of the CPU blades 201. The estimated values of the loads are calculated based on the number of processings of the control signal processed by the CPU blade 201 within the fixed time, the number of times that the paging is executed within the fixed time, the number of users in radio communication, a total sum of the CPU usage ratios, the tracking area update count, and the like.

Subsequently, if the estimated value of the load on the CPU blade 201 (MME 103) becomes equal to or smaller than a predetermined threshold value or if the estimated value of the load on the CPU blade 201 (MME 103) becomes the lowest among the estimated values of the loads on the other CPU blades 201 (MMEs 103), the CPU blade 201 (MME 103) decides to switch to the power-saving state (1512). It should be noted that the monitor management control blade 203 may calculate the estimated value of the load on each of the CPU blades 201 (MMEs 103) based on the message on the load information acquired from each of the CPU blades 201 (MMEs 103), compare the estimated values of the loads that have been calculated with one another, and select the CPU blade 201 (MME 103) having the lowest estimated value of the load as the CPU blade which is to switch to the power-saving state (1512). Further, the CPU blade 201 (MME 103) may switch to the power-saving state if the number of the user entities 1501 accommodated in itself becomes smaller than a predetermined number.

Further, the CPU blade which is to switch to the power-saving state at a predetermined time of day (for example, in the middle of the night) may be determined in advance. Further, the monitor management control blade 203 may estimate the load on the whole servers based on the load information acquired from each of the blades, and if the estimated load has a smaller value than a predetermined threshold value, the CPU blade 201 determined in advance may switch to the power-saving state. The CPU blade 201 (MME 103) which is to switch to the power-saving state corresponds to the relocation source MME 1503.

The relocation source MME 1503 requests each base station 1502 to delete its own entry from the MME pool table 502 included in each base station 1502 or to set the weighting parameter to "0" therein in order to prevent itself from being selected as the MME 103 at the accommodation target (1513).

Therefore, the user entity 101 in the idle state accommodated in the relocation source MME 1503 is accommodated into another CPU blade 201 (for example, relocation target MME 1504) when the next tracking area update is performed. It should be noted that a processing of changing the MME pool table 502 performed in Step 1513 may be executed by the relocation source MME 1503 or may be executed by another system managing the monitor management control blade 203 and the like based on the administrator's instruction.

Subsequently, the base station 1502 changes the value of the TAI included in the broadcasting control channel to a different value from the value assigned in the TA list included in the user entity 1501 (1515). It should be noted that the processing of Step 1515 may be executed by the system operating and managing the monitor management control blade 203 based on the administrator's instruction. The base station 1502 transmits the broadcasting control channel including the changed TAI (1516).

The user entity 1501 receives the broadcasting control channel including the changed TAI. If the TAI included in the broadcasting control channel is a TAI which is not included in the TA list included in the user entity 1501, the user entity 1501 transmits a tracking area update request to the base station 1502 (1517).

The tracking area update request includes the GUTI assigned by the relocation source MME 1503 accommodating the user entity 1501 at the present time, and hence the base station 1502 can identify the MME 1503 accommodating the user entity 1501. However, according to the MME pool table 502 included in the base station 1502, the MME 1503 which is to switch to the power-saving state is prevented from being selected (1513). Therefore, the base station 1502 selects a new MME 103, in other words, the relocation target MME 1504 from the MME pool table 502, and forwards the tracking area update request transmitted from the user entity 1501 to the selected relocation target MME 1504 (1518).

The relocation target MME 1504 which is to newly accommodate the user entity 1501 requests the relocation source MME 1503 to transmit context information on the user entity 1501 (1519), and acquires the context information on the user entity 1501 transmitted from the relocation source MME 1503 (1520). The relocation target MME 1504 notifies the relocation source MME 1503 that the context information has been acquired (1521). Based on the acquired context information, the relocation target MME 1504 authenticates and accommodates the user entity 1501.

Subsequently, the relocation target MME 1504 judges whether or not the S-GW 104 accommodating the user entity 1501 needs to be changed (1522). If it is judged that the S-GW 104 needs to be changed, the relocation processing for the S-GW 104 is executed. It should be noted that in Step 1511, the relocation target MME 1504 judges based on the load information acquired from each of the S-GWs 104 whether or not the S-GW 104 that accommodates the user entity 1501 is to be changed.

Further, the monitor management control blade 203 or the MME 103 in the in-service state may judge based on the load information acquired from each of the S-GWs 104 whether or not the S-GW 104 that accommodates the user entity 101 is to be changed. Further, the S-GW 104 which is to switch to the power-saving state may be determined in advance according to a predetermined schedule.

It should be noted that the above-mentioned load information on each of the S-GWs 104 includes the contents of the load measurement table on the S-GW 104 illustrated in FIG. 10. Specifically, the load information includes the S-GW name 1001, the accommodated mobile terminal count 1002, the signal processing count 1003 of the control signal processed within the fixed time, the active user count 1004 in radio communication, the CPU usage ratio 1005 within the fixed time, the forwarded packet count 1006 within the fixed time, and the forwarded byte count 1007 within the fixed time.

In order to execute the relocation of the S-GW 104, the relocation target MME 1504 requests the relocation target S-GW 1506 to newly accommodate the user entity 1501 and to further set a tunnel between the base station 1502 and the relocation target S-GW 1506 (1523).

The relocation target S-GW 1506 notifies the P-GW 1507 that the S-GW 104 has been changed and of the new tunnel information (1524). The P-GW 1507 notifies the S-GW 1506 that the new tunnel information has been received (1525). The relocation target S-GW 1506 notifies the relocation target MME 1504 that the tunnel has been successfully created (1526).

Subsequently, the relocation target MME 1504 requests the home subscriber server 1508 for the tracking area update of the user entity 1501, (1527). The home subscriber server 1508 requests the relocation source MME 1503 to delete the information on the user entity 1501 (1528). The relocation source MME 1503 deletes the information on the user entity 1501, and notifies the home subscriber server 1508 that the information on the user entity 1501 has been deleted (1529).

The home subscriber server 1508 notifies the relocation target MME 1504 that the tracking area update for the user entity 1501 has been completed and of the newly registered information on the user entity 1501 (1530).

Subsequently, the relocation source MME 1503 requests the relocation source S-GW 1505 to delete an entry of the user entity 1501 for the tunnel (1531). The relocation source S-GW 1505 deletes the entry of the user entity 1501 for the tunnel, and notifies the relocation source MME 1503 that the processing for deletion has been completed (1532).

Subsequently, the relocation target MME 1504 notifies the user entity 1501 via the base station 1502 that the tracking area update has been completed (1533).

The user entity 1501 notifies the relocation target MME 1504 that the notification that the tracking area update has been completed has been received (1534).

The relocation source MME 1503 (or relocation source S-GW 1505) repeatedly performs the above-mentioned processing to thereby relocate the user entity 1501 accommodated by itself to another MME 103 (or S-GW 104) and then switch to the power-saving state (1535).

It should be noted that in the mobile communication system according to the third embodiment, in the same manner as in the first embodiment, the switch to the power-saving state may be caused by interrupting the power source by using the IPMC 305 and the power relay 307, or the switch to the power-saving state may be caused by effecting the sleep state by reducing or stopping the clock of the CPU. Further, in the case where the multicore processor is used, the switch to the power-saving state may be caused by cutting down the number of running cores.

As described above, according to the third embodiment, the base station notifies the user entity in the idle state within the tracking area of the TAI which is not included in the tracking area (TA) list included in the user entity to thereby allow the user entity in the idle state to newly make a tracking area update request. Further, as in the same effect as the second embodiment, the mobile communication system uses the tracking area update request received from the user entity in the idle state to thereby make it possible to change the mobility management entity (and service gateway) accommodating the user entity.

Further, as in the same effect as the first embodiment, the base station can select the mobility management entity (or service gateway) accommodating the user entity based on the weighting parameters described in the pool tables of the mobility management entity and the service gateway. Further, as in the same effect as the first embodiment, the mobile communication system can reduce the power consumption by switching the mobility management entity and the service gateway to the power-saving state.

Fourth Embodiment

Hereinafter, description is made of a processing performed in a case where the MME 103 and the S-GW 104 in the power-saving state switch to the in-service state.

Figure 16:
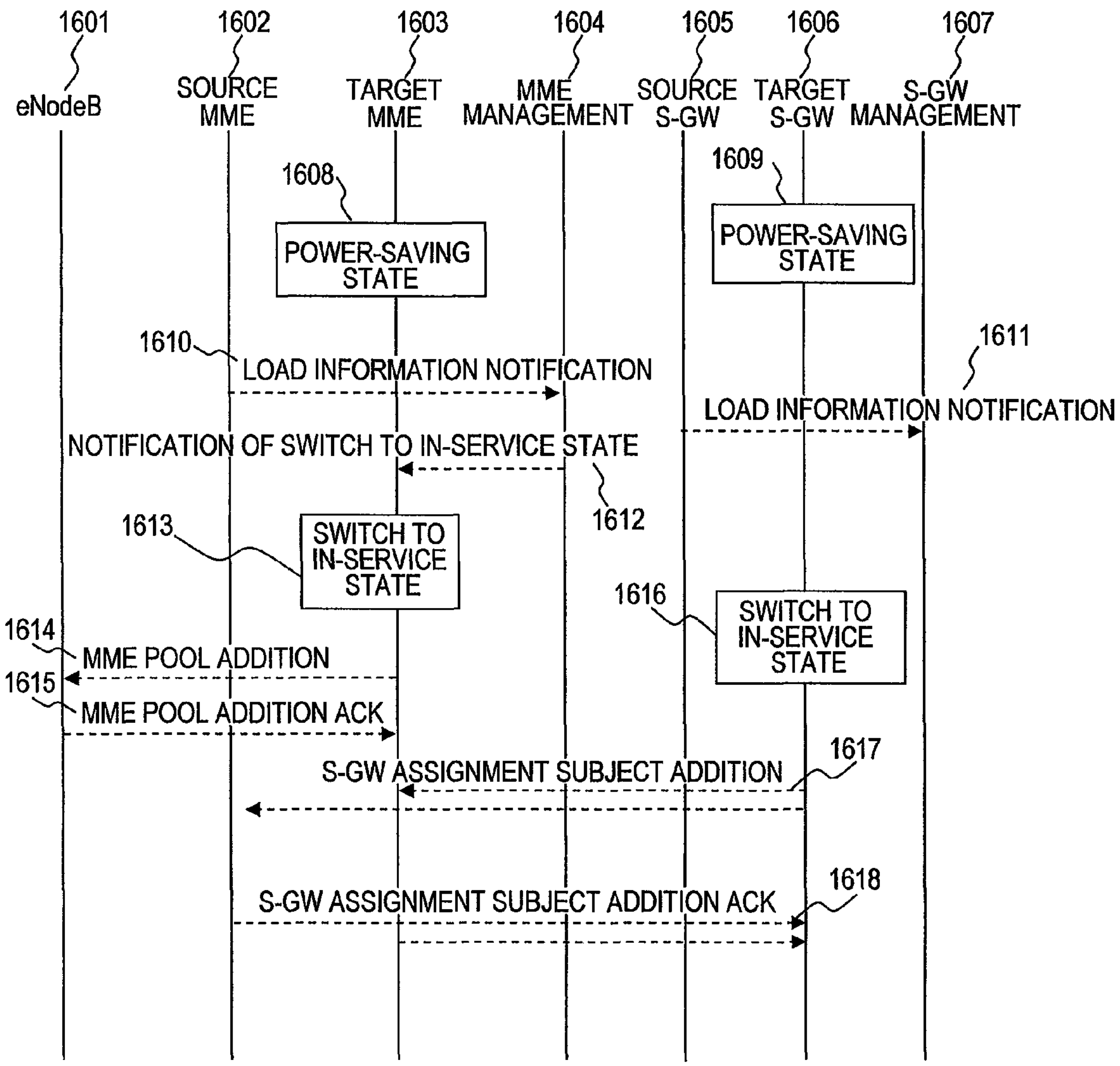
FIG. 16 is a sequential diagram illustrating a switch from the power-saving state to the in-service state according to a fourth embodiment of this invention.

FIG. 16 is a sequential diagram illustrating a switch from the power-saving state to the in-service state according to a fourth embodiment of this invention.

A base station (eNodeB) 1601 is the base station 102. The base station 1601 has not selected the MME 103 in the power-saving state as the accommodation target of the user entity 101. A source MME 1602 is the CPU blade 1301 in the in-service state which operates as the MME 103 as illustrated in FIG. 13. A target MME 1603 is the CPU blade 1302 in the power-saving state which operates as the MME 103 as illustrated in FIG. 13 (1608).

A monitor management control blade (MME management) 1604 is the monitor management control blade 203 for managing the MME 103. A source S-GW 1605 is the CPU blade 1301 in the in-service state which operates as the S-GW 104 as illustrated in FIG. 13. A target S-GW 1606 is the CPU blade 1302 in the power-saving state which operates as the S-GW 104 as illustrated in FIG. 13 (1609). A monitor management control blade (S-GW management) 1607 is the monitor management control blade 203 for managing the S-GW 104.

First, the MME 1603 is in the power-saving state (1608). The S-GW 1606 is in the power-saving state (1609). The monitor management control blade 1604 acquires the load information from the MME 1602 in service (1610).

Here, the acquired load information includes the contents of the load measurement table 704 illustrated in FIG. 8. Specifically, the contents includes information on each of the CPU blades operating as the MMEs 1602 in the in-service state, in other words, the accommodated user entity count 802, the signal processing count 803 of the control signal processed within the fixed time, the paging count 804 of the paging executed within the fixed time, the active user count 805 in radio communication, the CPU usage ratio 806, and the tracking area update count 807.

Based on the acquired load information, the monitor management control blade 1604 calculates the estimated value of the load on the whole blades and the estimated value of the load on each of the CPU blades 201, and if the calculated estimated value of the load on the whole exceeds a predetermined threshold value or if the estimated value of the load on the CPU blade 201 operating as a specific MME 103 exceeds a predetermined threshold value, decides to switch the MME 103 being operated in the power-saving state to the in-service state. Further, the monitor management control blade 1604 notifies the MME 1603 to be switched to the in-service state of the switch to the in-service state (1612). It should be noted that the monitor management control blade 1604 may switch a predetermined CPU blade 201 from the power-saving state to the in-service state based on a preset schedule.

It should be noted that in order to cause the switch from the power-saving state to the in-service state, the monitor management control blade 1604 may use the IPMC 305 and the power relay 307 to activate the power source or may return the reduced or stopped clock of the CPU to a normal clock. Further, in the case of using the multicore processor, the cutdown number of cores may be returned to a normal number of cores. The MME 1603 switches from the power-saving state to the in-service state based on the notification received from the monitor management control blade 1604 (1613).

The MME 1603 that has been brought to the in-service state requests the base station 1601 to add itself to the MME pool table 502 (1614). The base, station 1601 adds the entry of the MME 1603 that has been brought to the in-service state to the MME pool table 502, and notifies the MME 1603 that the addition has been completed (1615). It should be noted that the system that operates and manages the monitor management control blade 1604 may change the MME pool table 502 based on the administrator's instruction. Further, if the weighting parameter of the MME 1603 described in the MME pool table 502 is "0", the base station 1601 may change the weighting parameter to a positive value to thereby allow the MME 1603 to be selected as the accommodation target of the user entity 101.

Meanwhile, the monitor management control blade 1607 acquires the load information from the S-GW 1605 in service (1611). The load information includes the contents of the load measurement table 903 on the S-GW 104 illustrated in FIG. 10. Specifically, the load information includes the S-GW name 1001, the accommodated mobile terminal count 1002, the processing count 1003 of the control signal processed within the fixed time, the active user count 1004 in radio communication, the CPU usage ratio 1005 within the fixed time, the forwarded packet count 1006 within the fixed time, and the forwarded byte count 1007 within the fixed time.

Based on the acquired load information, the monitor management control blade 1607 calculates the estimated value of the load on the whole blades and the estimated value of the load on each of the CPU blades 201, and if the calculated estimated value of the load on the whole exceeds a predetermined threshold value or if the estimated value of the load on the CPU blade 201 operating as a specific S-GW 104 exceeds a predetermined threshold value, decides to switch the S-GW 104 being operated in the power-saving state to the in-service state (1616). It should be noted that the monitor management control blade 1607 may switch a predetermined S-GW 104 from the power-saving state to the in-service state based on a preset schedule.

In order to switch the S-GW 104 from the power-saving state to the in-service state, the monitor management control blade 1607 may use the IPMC 305 and the power relay 307 to activate the power source or may return the reduced or stopped clock of the CPU to the normal clock. Further, in the case of using the multicore processor, the cutdown number of cores may be returned to the normal number of cores.

The S-GW 1606 that has been brought to the in-service state requests the MMEs 1602 and 1603 that are in the in-service state to set itself as an assignment target (1617). The MMEs 1602 and 1603 that have received the request for addition of the assignment target add the S-GW 1606 as the assignment target, and notifies the S-GW 1606 that the S-GW 1606 has been added as the assignment target (1618). It should be noted that the system that operates and manages the monitor management control blade 1607 may execute the processing of Step 1617.

As described above, according to the fourth embodiment, the mobility management entity that has switched from the power-saving state to the in-service state can newly set itself as the accommodation target of the user entity by adding the entry of itself to the pool table of the mobility management entity included in the base station or by changing the weighting parameter described in the pool table. Further, the mobility management entity can assign the service gateway that has switched to the in-service state to the user entity by adding the entry of the service gateway that has switched from the power-saving state to the in-service state to the pool table included in itself.

Fifth Embodiment

Hereinafter, description is made of a processing performed in a case where the MME 103 switches to the power-saving state.

Figure 17:
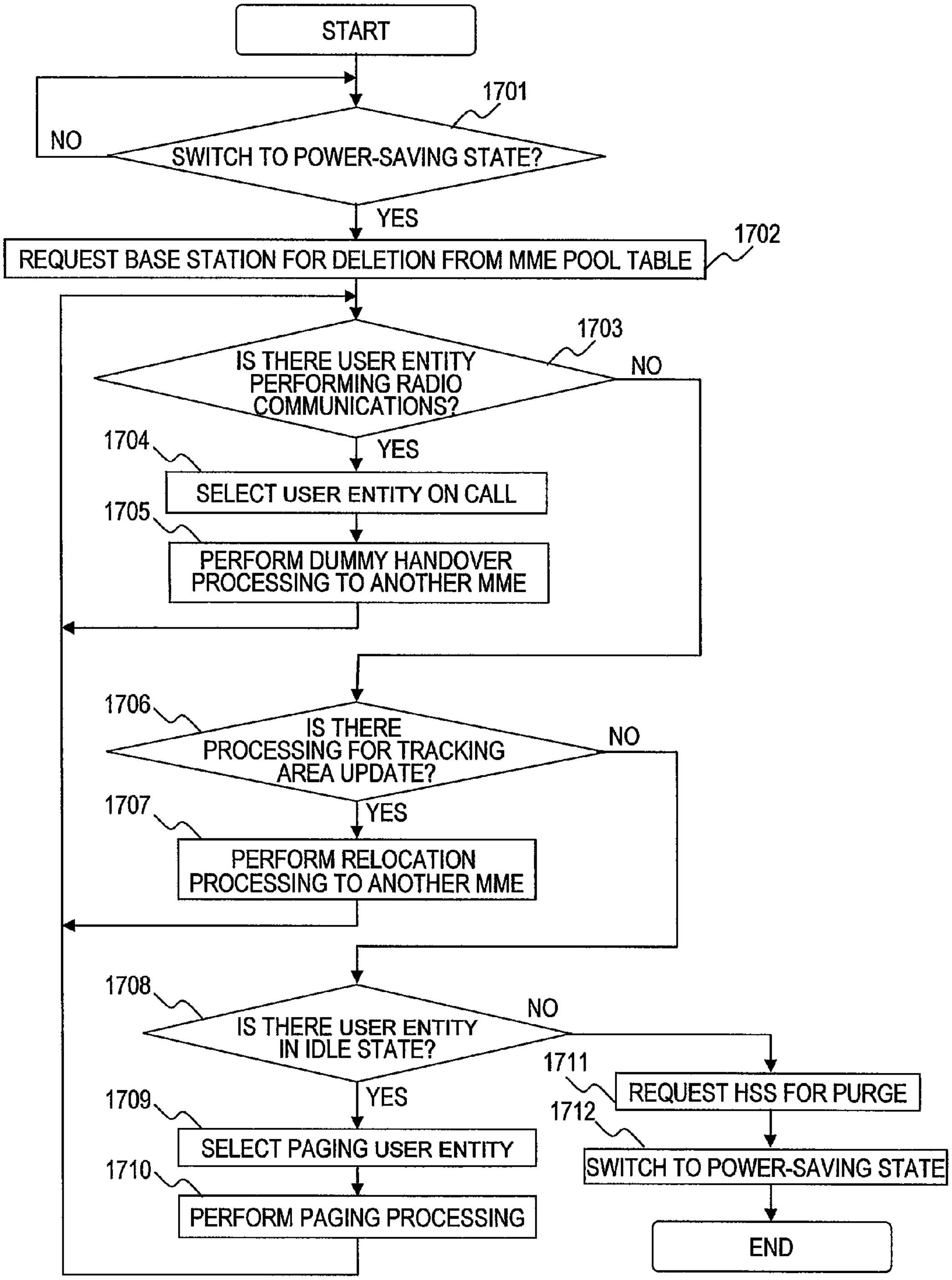
FIG. 17 is a flowchart illustrating the processing for a switch to the power-saving state performed by the MME according to a fifth embodiment of this invention.

FIG. 17 is a flowchart illustrating the processing for a switch to the power-saving state performed by the MME according to a fifth embodiment of this invention.

First, the CPU blade 201 operating as the MME 103 judges whether or not to switch to the power-saving state based on the loaded states exchanged with the other MMEs 103 or the request received from the monitor management control blade 203 (1701).

If judging in Step 1701 to switch to the power-saving state, the MME 103 requests the base station 102 to delete the entry of itself from the MME pool table 502 (1702).

Subsequently, the MME 103 judges whether or not there exists the user entity 101 in radio communication among the accommodated user entities 101 (1703).

If judging in Step 1703 that there exists the user entity 101 in radio communication, the MME 103 selects the user entity 101 in communication (1704), executes the processing for the dummy handover on the selected user entity 101 by the accommodated user relocation function 705 as illustrated in FIG. 7 (1705), and reaccommodates the user entity 101 in communication to another MME 103. The processing of Steps 1704 and 1705 is repeatedly performed until every user entity 101 (user) in communication has been accommodated into another MME 103.

Meanwhile, if judging in Step 1703 that there exists the user entity 101 in radio communication, the MME 103 then judges whether or not there exists the user entity 101 that requests for the tracking area update (1706).

If judging in Step 1706 that there exists the user entity 101 that requests for the tracking area update, the MME 103 uses the accommodated user relocation function 705 as illustrated in FIG. 7 to accommodate the user entity 101 into another MME 103 by using the processing for the tracking area update of the user entity 101 (1707).

If judging in Step 1706 that there does not exist the user entity 101 that requests for the tracking area update, the MME 103 judges whether or not there exists the user entity 101 in the idle state among the accommodated user entities 101 (1708).

If judging in Step 1708 that there exists the user entity 101 in the idle state, the MME 103 selects the user entity 101 in the idle state (1709), and executes paging on the selected user entity 101 (1710). In the above-mentioned Steps 1704 and 1705, the relocation to another MME 103 is executed on the user entity 101 that has been brought to a communicating state by the paging.

If judging in Step 1708 that there does not exist the user entity 101 in the idle state, for example, if a given user entity 101 accommodated therein does not respond even after the paging is repeated in Steps 1709 and 1710, the MME 103 requests the position management server managing the given user entity 101 to delete therefrom the information on the given user entity 101 (1711), and switches to the power-saving state (1712).

As described above, according to the fifth embodiment, the mobility management entity which is to switch to the power-saving state can reaccommodate the user entity in the active state (in communication) into another mobility management entity by the processing for the dummy handover. Further, by using the processing for the tracking area update, it is possible to reaccommodate the user entity in the idle state into another mobility management entity.

According to a representative embodiment of this, invention, the power consumption can be reduced by changing the configuration of the running nodes according to the loads such as traffic amounts in a mobile communication network.

While the present invention has been described in detail and pictorially in the accompanying drawings, the present invention is not limited to such detail but covers various obvious modifications and equivalent arrangements, which fall within the purview of the appended claims.

What is claimed is:

1. A mobile communication system, comprising:

a plurality of base stations to which mobile terminals are to be connected; and a plurality of call control servers that accommodate the mobile terminals based on a location registration request, wherein:

the plurality of call control servers include at least a first call control server and a second call control server, and an identifier identifying one of the call control servers which accommodates the mobile terminals and that is assigned to each of the mobile terminals, the first call control server is configured to:

calculate a load on the first call control server based on a processing amount of control signals between the plurality of base stations and the first call control server; and cause at least one of the mobile terminals accommodated in the first call control server to transmit the location registration request in a case in which it is judged that the load on the first call control server is low, based on at least one of a result of comparison between the calculated load and a predetermined threshold value and a result of comparison between the number of mobile terminals accommodated in the first call control server and a predetermined number;

the one of the plurality of base stations corresponding to the one of the mobile terminals is configured to:

select the second call control server into which the one of the mobile terminals is to be newly accommodated from among the plurality of call control servers in a case in which the location registration request transmitted from the one of the mobile terminals is received; and forward the location registration request to the selected second call control server;

the second call control server is configured to accommodate the one of the mobile terminals in a case in which the forwarded location registration request is received; and the first call control server is further configured to switch to a power-saving state after all of the mobile terminals which are assigned the identifier representing the first call control server are accommodated into the second call control server.

2. The mobile communication system according to claim 1, wherein the first call control server causes the one of the mobile terminals accommodated in the first call control server to transmit the location registration request in a case in which a predetermined time of day is reached instead of based on the calculated load.

3. The mobile communication system according to claim 1, wherein:

the control signals between base stations and the first call control server is a paging signal transmitted from the one of the plurality of base stations to the one of the mobile terminals; and the first call control server calculates the load on the first call control server based on the processing amount of the control signals.

4. The mobile communication system according to claim 1, wherein:

the control signals between base stations and the first call control server is a signal of the location registration request transmitted from the one of the mobile terminals; and the first call control server calculates the load on the first call control server based on a processing amount of the location registration request.

5. The mobile communication system according to claim 1, wherein the second call control server accommodates the one of the mobile terminals accommodated in the first call control server by the one of the mobile terminals being subjected to handover from the first call control server to the second call control server.

6. The mobile communication system according to claim 1, wherein:

the one of the mobile terminals is configured to transmit the location registration request to the one of the base stations according to a predetermined cycle period; and the first call control server causes the one of the mobile terminals accommodated in the first call control server to transmit the location registration request by setting a cycle period shorter than the predetermined cycle period if it is judged that the load on the first call control server is low based on one of the result of the comparison between the calculated load on the first call control server and the predetermined threshold value and the result of the comparison between the number of mobile terminals accommodated in the first call control server and the predetermined number.

7. The mobile communication system according to claim 1, wherein:

the one of the mobile terminals is configured to store information on an identifier of an location registration area which is transmitted by the one of the plurality of base stations; and the first call control server causes the one of the mobile terminals accommodated in the first call control server to transmit the location registration request by setting the identifier of the location registration area which is transmitted by the one of the plurality of base stations to another identifier different from the identifier of the location registration area which is stored in the one of the mobile terminals in a case in which it is judged that the load on the first call control server is low based on one of the result of the comparison between the calculated load on the first call control server and the predetermined threshold value and the result of the comparison between the number of mobile terminals accommodated in the first call control server and the predetermined number.

8. The mobile communication system according to claim 1, wherein each of the plurality of base stations is further configured to:

manage management information on the plurality of call control servers which includes information on the calculated load; and select the second call control server from among the plurality of call control servers based on the information on the load included in the management information if the location registration request transmitted from the mobile terminal is received.

9. The mobile communication system according to claim 1, wherein the first call control server is further configured to switch to an in-service state after switching to the power-saving state in one of a case in which the load on the plurality of call control servers in the in-service state is equal to or higher than a predetermined threshold value and a case where a predetermined time of day is reached.

10. The mobile communication system according to claim 1, wherein:

each of the plurality of call control servers is a blade server; and the plurality of blade servers are connected to one another.

11. A call control server, which is connected to a plurality of base stations to which a plurality of mobile terminals are to be connected and accommodates one or more of the plurality of mobile terminals based on a location registration request, comprising:

an interface connected to another call control server;

a processor; and a memory, wherein an identifier identifying the call control server which accommodates the mobile terminals is assigned to each of the mobile terminals, and wherein the processor is configured to:

calculate a load on the call control server based on a processing amount of control signals between the plurality of base stations and the call control server;

cause at least one of the plurality of mobile terminals accommodated in the call control server to transmit the location registration request in a case in which it is judged that the load on the call control server is low based on at least one of a result of comparison between the calculated load and a predetermined threshold value and a result of comparison between the number of mobile terminals accommodated in the call control server and a predetermined number; and switch to a power-saving state after all of the mobile terminals which are assigned the identifier representing the call control server are accommodated into another call control server according to the location registration request transmitted by respective ones of the mobile terminals.

* * * * *